US006112952A

United States Patent [19]

Hess, III et al.

[11] Patent Number: 6,112,952

[45] Date of Patent: Sep. 5, 2000

[54] VALVED DISPENSING SYSTEM WITH HYDRAULIC HAMMER PROTECTION FOR THE VALVE

[75] Inventors: John M. Hess, III, Midland; Timothy R. Socier; Steven R. Tuckey, both of Essexville, all of Mich.

[73] Assignee: AptarGroup, Inc., Crystal Lake, Ill.

[21] Appl. No.: 09/306,270

[22] Filed: May 6, 1999

[51] Int. Cl.[7] .............................. B65D 5/72; E03B 11/00; E03C 11/00; F17D 11/00; F16K 15/14

[52] U.S. Cl. ....................... 222/494; 222/490; 137/614.2; 137/849

[58] Field of Search .................................... 222/490, 494; 137/614.2, 849, 843

[56] References Cited

U.S. PATENT DOCUMENTS

| | | | |
|---|---|---|---|
| 1,120,901 | 12/1914 | Buckland | 137/614.2 |
| 2,913,749 | 11/1959 | Ayres | 222/494 |
| 5,730,336 | 3/1998 | Lerner | 222/490 |
| 5,904,275 | 5/1999 | Suffa | 222/494 |

*Primary Examiner*—Kevin Shaver
*Assistant Examiner*—David A. Bonderer
*Attorney, Agent, or Firm*—Rockey, Milnamow & Katz, Ltd.

[57] ABSTRACT

A dispensing system is provided for dispensing liquid from a container. The system includes a discharge conduit defining a flow passage for establishing fluid communication with liquid from the container. A resilient valve is provided to extend across the discharge flow passage. The valve has an interior side for being contacted by the liquid and an exterior side exposed to ambient external atmosphere. The valve defines a dispensing orifice that opens when pressure on the valve interior side exceeds the pressure on the exterior side by a predetermined amount. A resilient baffle is located upstream of the valve. The baffle includes an occlusion member supported by at least one resilient support member which (1) accommodates movement of the occlusion member between a closed position occluding flow into at least a portion of the conduit flow passage when the baffle is subjected to an upstream hydraulic hammer pressure, and (2) biases the occlusion member to an open position permitting flow into the conduit flow passage adjacent the valve when the baffle is not subjected to a hydraulic hammer pressure.

20 Claims, 21 Drawing Sheets

VALVED DISPENSING SYSTEM WITH HYDRAULIC HAMMER PROTECTION FOR THE VALVE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a liquid dispensing system for dispensing liquid from a container through a conduit controlled by a resilient valve which has a closed dispensing orifice that is displaceable outwardly to an open configuration when the pressure on the valve interior side exceeds the pressure on the valve exterior side by a predetermined amount. The system is particularly suitable for incorporation in a portable drink supply system which includes a liquid container, an attached conduit or spout from which a liquid may be directed from the container to a person's mouth, and an internal, resilient, self-sealing, slit-type valve. The invention protects the valve from hydraulic hammer, such as water hammer, or other transient liquid pressure increases which would tend to cause an undesirable opening of the valve.

BACKGROUND OF THE INVENTION AND TECHNICAL PROBLEMS POSED BY THE PRIOR ART

Various types of portable, dispensing drink containers have become popular. One type of container comprises a generally flexible bottle with a capped spout. The cap can be removed, the bottle can be tipped towards a person's mouth, and then the bottle can be squeezed to direct a stream of liquid (e.g., water, a commercial sports drink, etc.) into the person's mouth.

An improvement to such a system currently in public use includes a flexible, resilient, self-sealing, slit-type valve in the discharge spout. The valve is normally closed and can withstand the weight of the liquid when the bottle is completely inverted so that the liquid will not leak out unless the bottle is squeezed. With such an improved system, the cap need not be re-attached during periods when a person is carrying, and intermittently drinking from, the bottle.

While such a valved dispensing system has significant advantages and functions well, it would be desirable to provide an improved system that would better accommodate more rugged handling or abuse without leaking. Specifically, when the above-described type of valved bottle is dropped or knocked over, the liquid in the bottle may impact the valve with such force that the valve may momentarily open, and a small amount of liquid may be discharged. It would be beneficial to provide an improved dispensing system which eliminates or greatly minimizes the tendency of the valve to open when the bottle is tipped over or dropped.

Such an improved system should also accommodate the normal, easy dispensing of the liquid when a person desires to obtain a drink.

It would also be advantageous if such an improved system could accommodate bottles, containers, or packages that have a variety of shapes and that are constructed from a variety of materials.

Further, it would be desirable if such an improved system could accommodate efficient, high-quality, large volume manufacturing techniques with a reduced product reject rate to produce a system with consistent operating characteristics.

The present invention provides an improved system which can accommodate designs having the above-discussed benefits and features.

BRIEF SUMMARY OF THE INVENTION

The present invention provides a system for accommodating the dispensing of a liquid from a bottle, package, pouch, or other type of container through a conduit or spout into a person's mouth. The system can employ a resilient, self-sealing, slit-type valve that is normally closed and that opens when sufficient pressure is applied by the liquid to the inside of the valve. The system eliminates, or substantially minimizes, the tendency of such a valve to open under transient pressure conditions such as "water hammer" or other hydraulic hammer conditions that can occur when the system (or portion thereof) is dropped or knocked over. This will prevent, or at least substantially minimize, the likelihood of liquid inadvertently leaking from the system during such conditions.

According to one aspect of the present invention, the dispensing system includes a discharge conduit defining a flow passage for establishing communication with liquid from a container.

A resilient valve extends across the discharge conduit flow passage. The valve defines a normally closed dispensing orifice that is displaceable outwardly to an open configuration when pressure on the valve interior side exceeds the pressure on the valve exterior side by a predetermined amount. In a preferred embodiment, the valve is a resilient, self-sealing, slit-type valve.

A resilient baffle is located upstream of the valve. The baffle includes an occlusion member supported by at least one resilient support member which (1) accommodates movement of the occlusion member between a closed position occluding flow into at least a portion of the conduit flow passage adjacent the valve when the baffle is subjected to an upstream hydraulic hammer pressure, and (2) biases the occlusion member to an open position permitting flow into the conduit flow passage adjacent the valve when the baffle is not subjected to the hydraulic hammer pressure.

In a preferred design, the dispensing system includes an annular seat inwardly of the valve, between the baffle and the valve. The baffle preferably includes a disk-like central occlusion member connected to an annular support wall with a plurality of support members which (1) are normally biased to maintain the occlusion member spaced inwardly from the seat to accommodate flow through the conduit to the valve, and (2) accommodate movement of the occlusion member outwardly against the seat when the occlusion member is subjected to a hydraulic hammer pressure exceeding a predetermined amount.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DETAILED DESCRIPTION

While this invention is susceptible of embodiment in many different forms, this specification and the accompanying drawings disclose some specific forms as examples of the invention. The invention is not intended to be limited to the embodiments so described, however. The scope of the invention is pointed out in the appended claims.

For ease of description, the system of this invention is described in an upright position, and terms such as upper, lower, horizontal, etc., are used with reference to this position. It will be understood, however, that the system of this invention may be manufactured, stored, transported, used, and sold in an orientation other than the upright position described herein.

Figure 1:
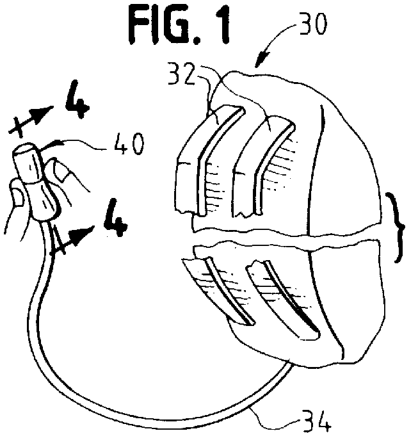
FIG. 1 is a perspective view of the dispensing system of the present invention incorporated in a sport hydration system which includes a liquid-containing backpack, delivery tube, and dispensing conduit assembly.

A first embodiment of the invention, in the form of a dispensing system included as part of a sport hydration system, is shown in FIG. 1. The sport hydration system includes a backpack 30 in which is disposed a liquid-impervious, flexible, collapsible, liquid-containing pouch (not visible). The backpack 30 includes special or conventional shoulder straps 32 which permit the backpack 30 to be worn on the user's back. The backpack 30 preferably includes conventional or special access means, such as zippers or the like, which permit the user to gain access to the interior, liquid-containing pouch for filling the pouch with water or other liquid.

The bottom of the liquid-containing pouch in the backpack 30 is connected to an elongate, flexible tube 34 which projects through a suitable opening in the bottom of the backpack 30 and which is generally long enough to reach a person's mouth when the backpack 30 is properly carried on a person's back. The backpack structure, insofar as it has been described, may be of any suitable special or conventional design, the details of which form no part of the present invention.

Figure 2:
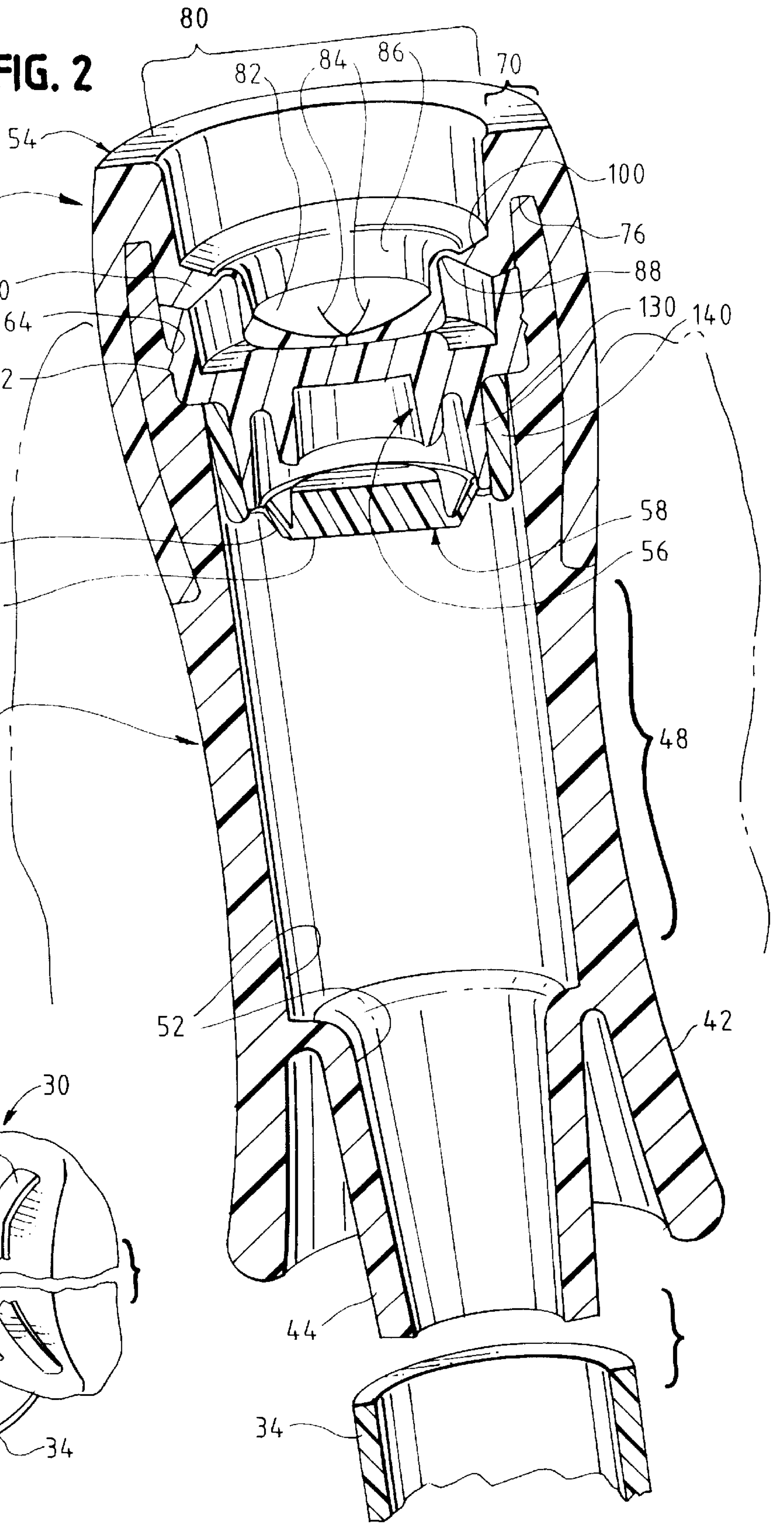
FIG. 2 is a greatly enlarged, fragmentary, exploded perspective, cross-sectional view of the dispensing conduit assembly.

The distal end of the tube 34 is provided with a dispensing conduit assembly 40 which is adapted to be inserted into a person's mouth. The person may suck through the dispensing conduit assembly 40 to withdraw liquid. As shown in FIG. 2, the dispensing conduit assembly 40 includes a discharge conduit 41 which has an inlet end defined by an outwardly flared bottom skirt 42 and an inner, tapered, male fitting 44 which is preferably formed as a unitary part of the discharge conduit 41. The tapered, male fitting 44 is adapted to be received within the distal end of the tube 34 and secured thereto by suitable means, such as a friction fit, and/or with a suitable bonding material, weld, or the like. The detailed design and construction of the attachment of the discharge conduit 41 to the tube 34 forms no part of the present invention.

Figure 5:
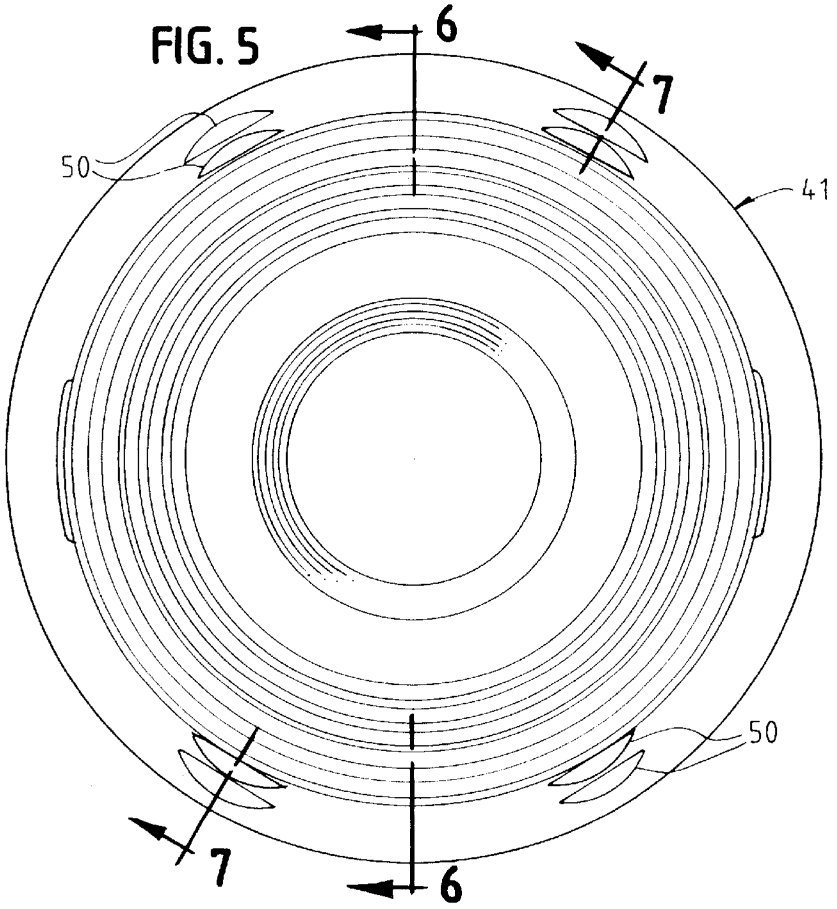
FIG. 5 is a greatly enlarged, top, plan view of the outer end of the discharge conduit with the other components of the dispensing conduit assembly omitted.
Figure 6:
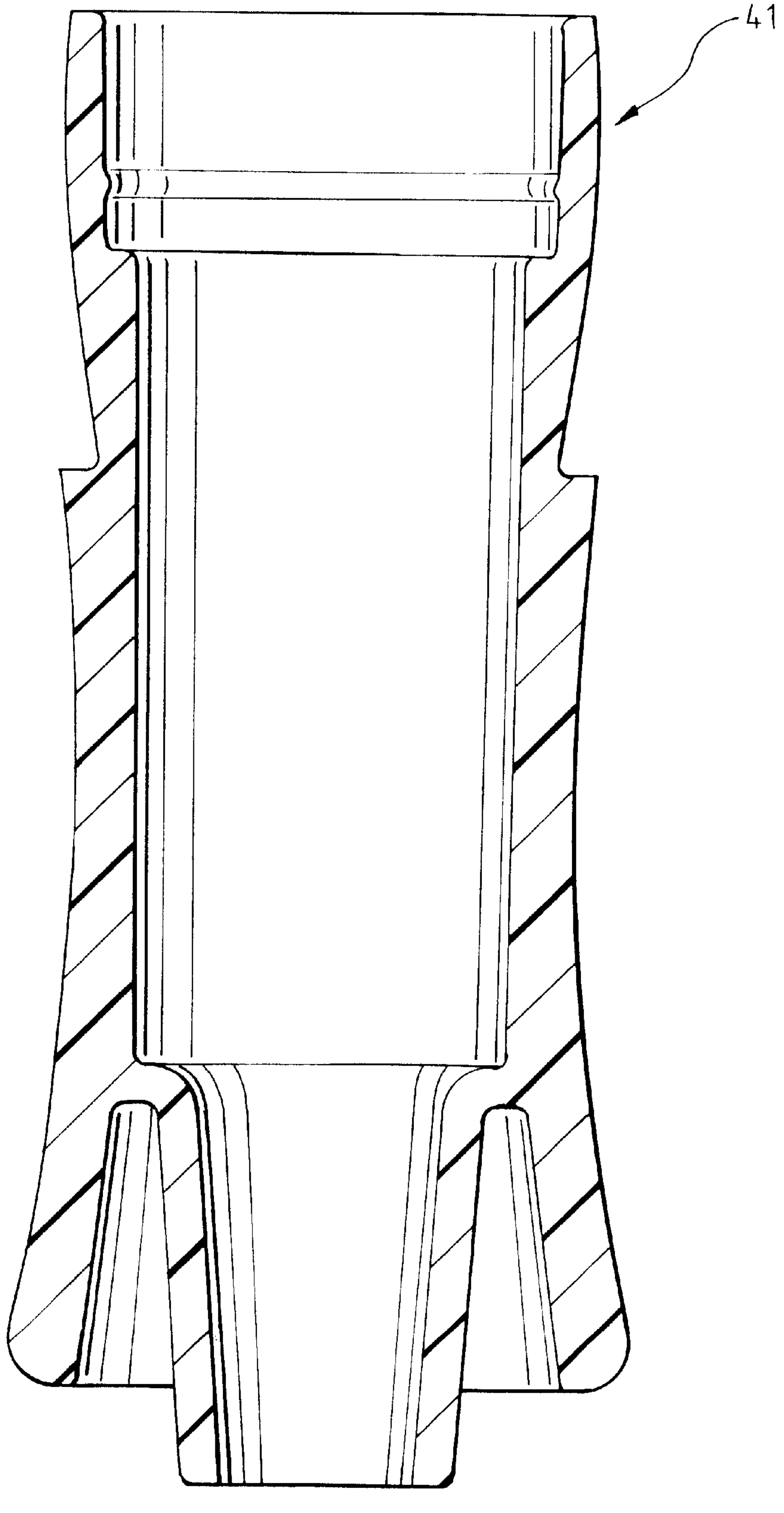
FIG. 6 is a reduced, cross-sectional view taken generally along the plane 6—6 in FIG. 5.

The discharge conduit 41 includes a central body portion 48, the exterior of which has a plurality of circumferentially spaced-apart protrusions or bumps 50 (FIG. 5) axially disposed along the length of the central portion 48 to provide a gripping aid. The discharge conduit 41 defines an internal flow passage 52 for establishing flow communication with the liquid from the container via the tube 34. In a preferred form, the discharge conduit 41 is a substantially rigid structure molded from a thermoplastic polymer, such as polypropylene.

The dispensing conduit assembly 40 includes, in addition to the discharge conduit 41, a cap valve 54 at the distal end of the discharge conduit 41, a restraint structure 56 inwardly of the cap valve 54, and a hydraulic hammer baffle 58 inwardly of the restraint structure 56.

Figure 7:
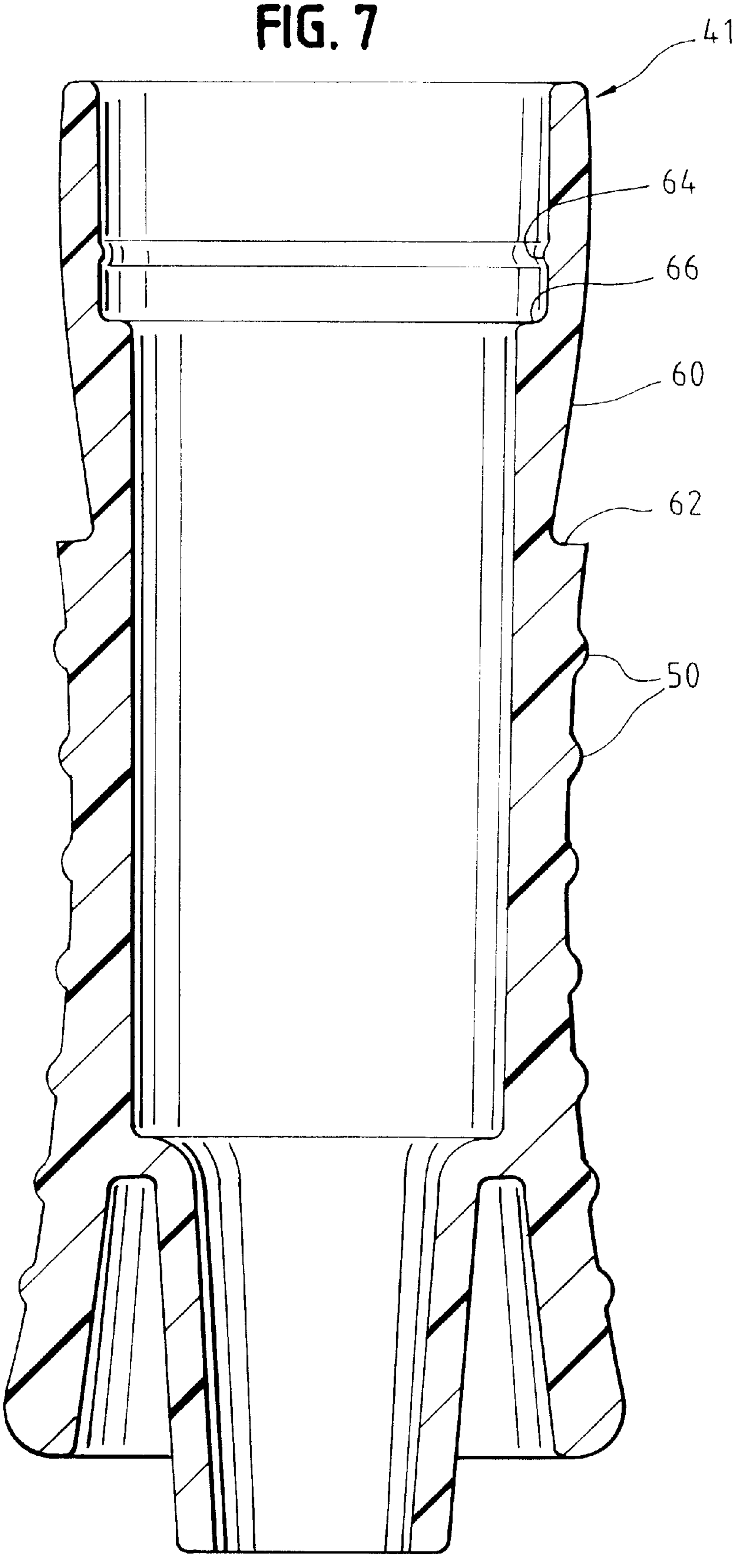
FIG. 7 is a reduced, cross-sectional view taken generally along the plane 7—7 in FIG. 5.
Figure 8:
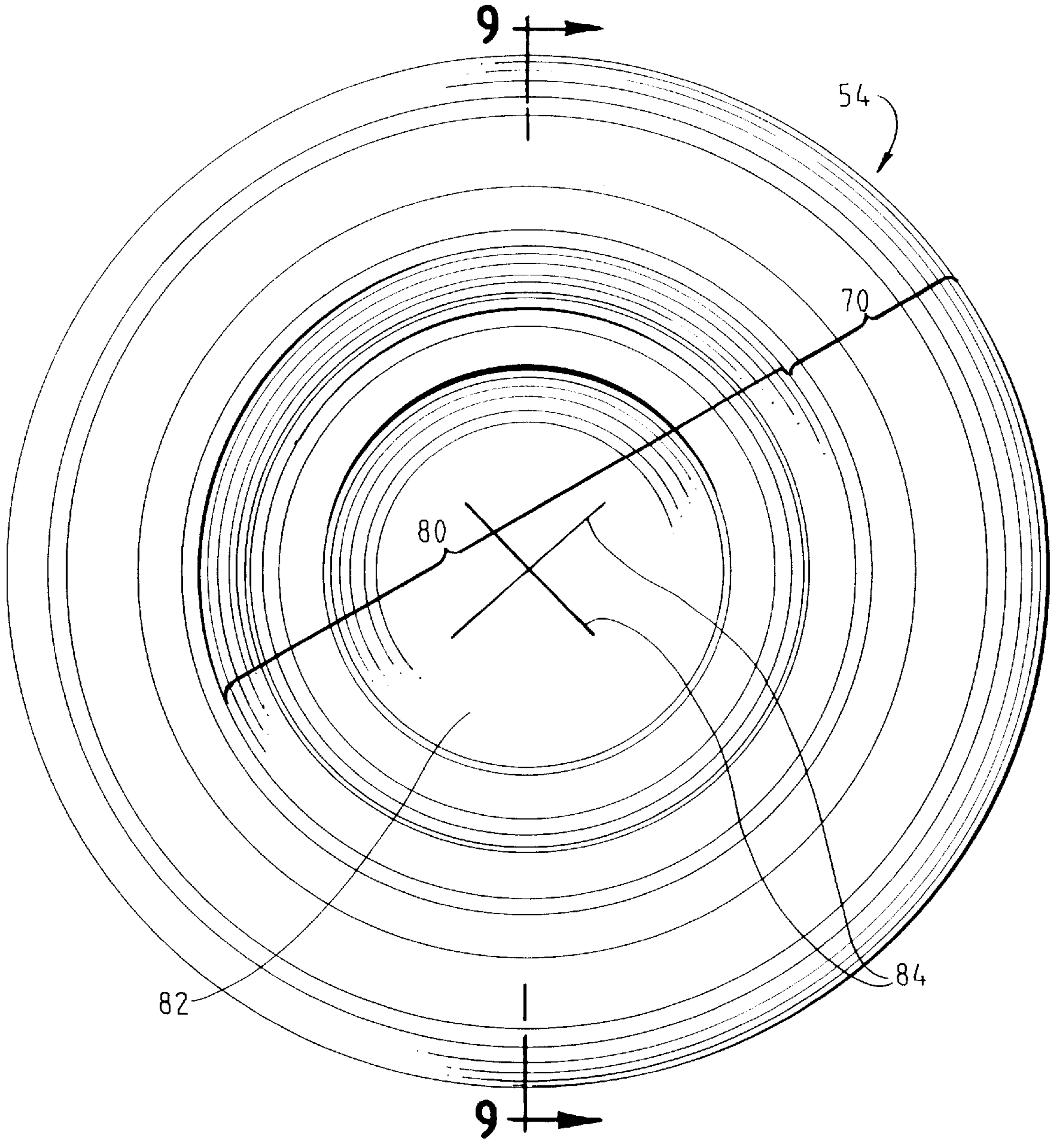
FIG. 8 is an enlarged, top, plan view of the unitary cap valve shown removed from the discharge conduit.

The cap valve 54, the restraint structure 56, and the baffle 58 are mounted on and within the discharge conduit 41 so as to form an integral assembly defining the dispensing conduit assembly 40. To this end, as shown in FIG. 7, the distal end of the discharge conduit 41 is specially adapted to receive the cap valve 54, restraint structure 56, and baffle 58. The distal end of the discharge conduit 41 includes an exterior, inwardly tapering surface 60 terminating in an annular shoulder 62. At the distal end of the discharge conduit 41, the interior of the discharge conduit 41 includes a radially inwardly projecting, annular bead 64 and a radially inwardly extending shoulder 66. The surface 60, shoulder 62, bead 64, and shoulder 66 are adapted to receive and engage portions of the cap valve 54 and restraint structure 56 at the distal end of the discharge conduit 41 as described in detail hereinafter.

Figure 3:
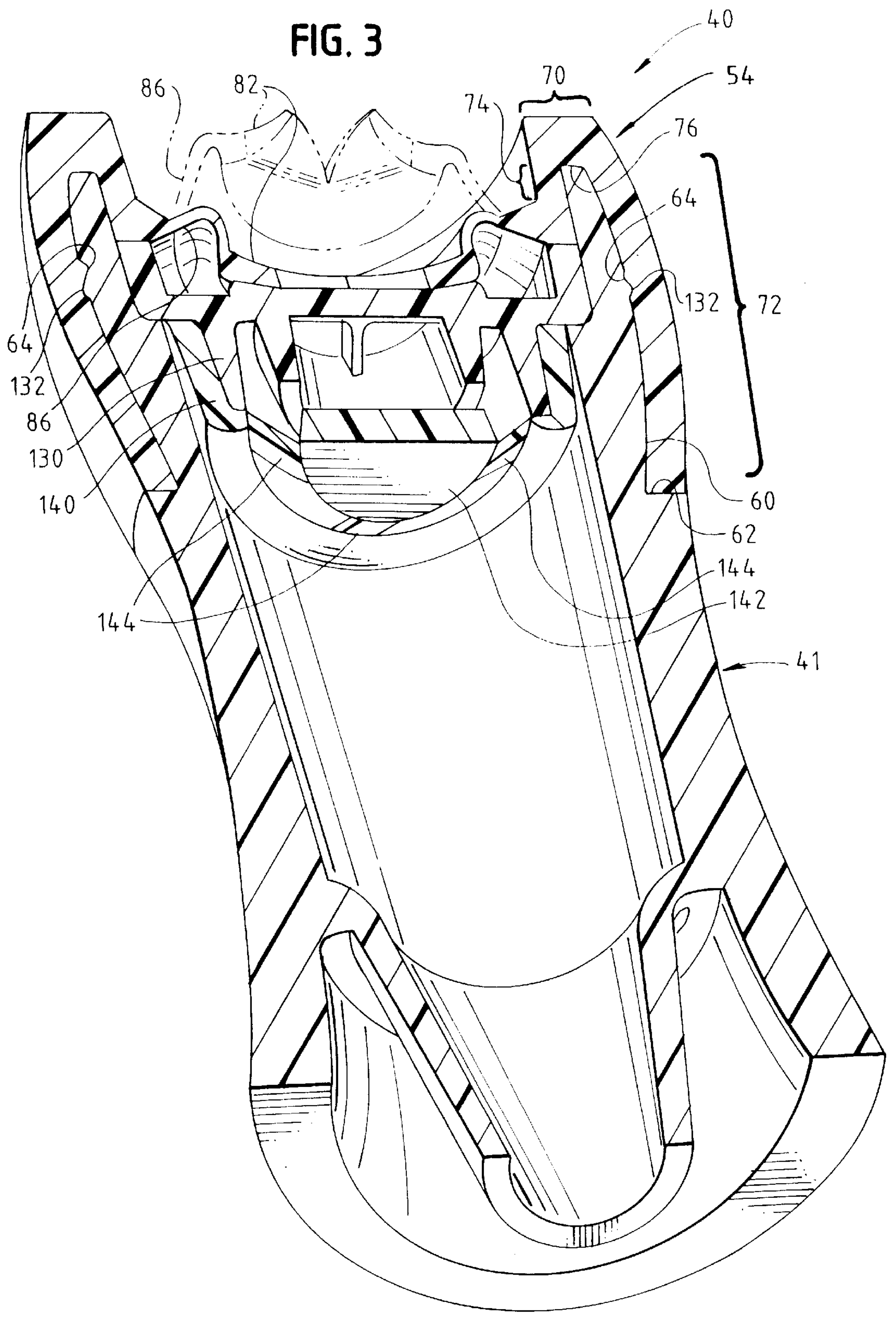
FIG. 3 is a view similar to FIG. 2, but FIG. 3 shows the dispensing conduit assembly as viewed from the inner end.
Figure 9:
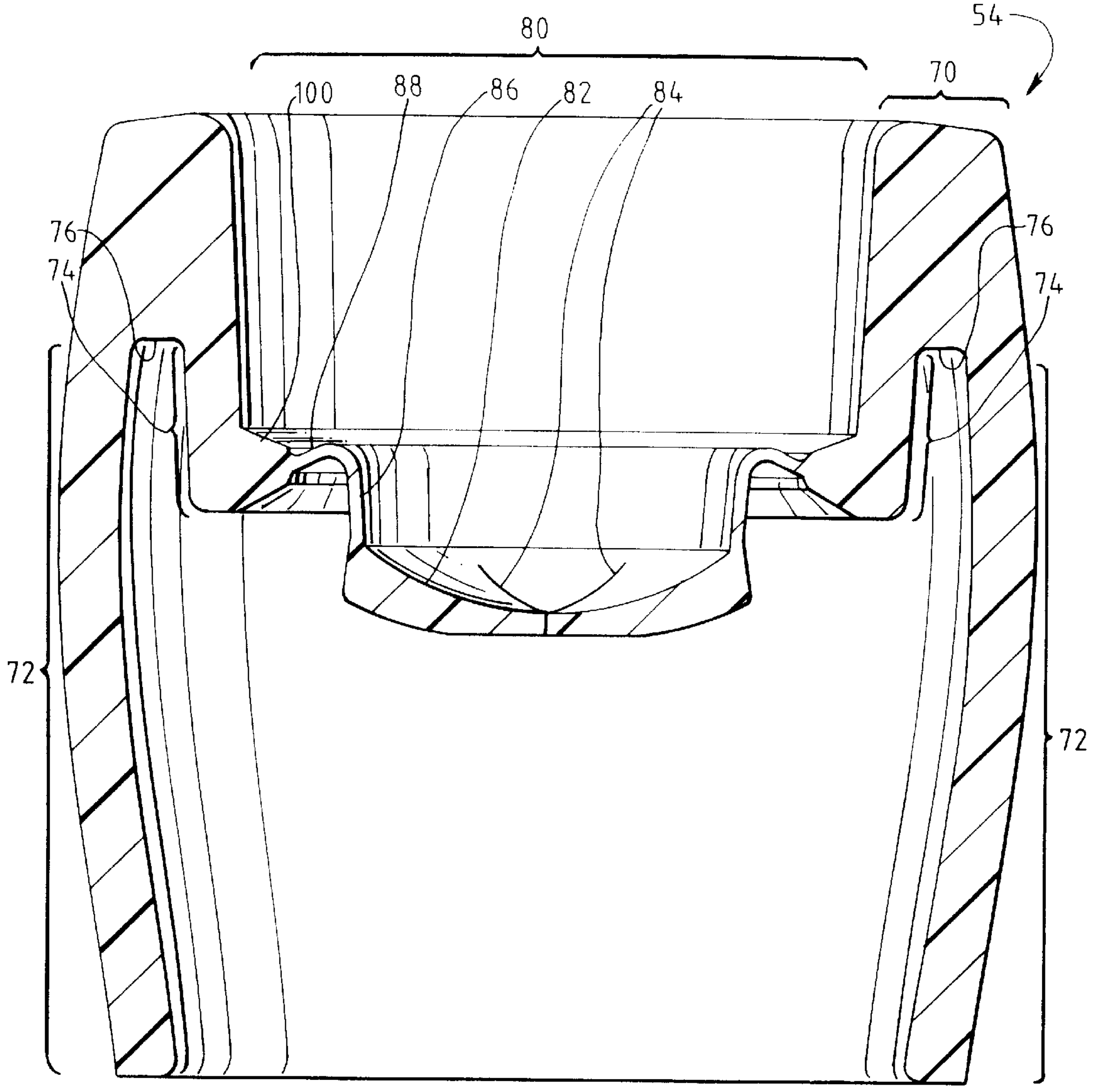
FIG. 9 is a cross-sectional view taken generally along the plane 9—9 in FIG. 8.

The cap valve 54 includes an annular end cap portion 70 (FIG. 9). The periphery of the end cap portion 70 extends downwardly to define a skirt 72, and the inner side of the annular end cap portion 70 extends downwardly to define an inner sleeve 74. The inner sleeve 74 is spaced radially inwardly from the skirt 72, and an annular channel 76 is defined between the inner sleeve 74 and skirt 72. The cap valve channel 76 is adapted to receive the upper, distal end of the discharge conduit 41, as shown in FIG. 3, so that the bottom end of the skirt 72 abuts the ends of the discharge conduit shoulder 62.

Figure 4:
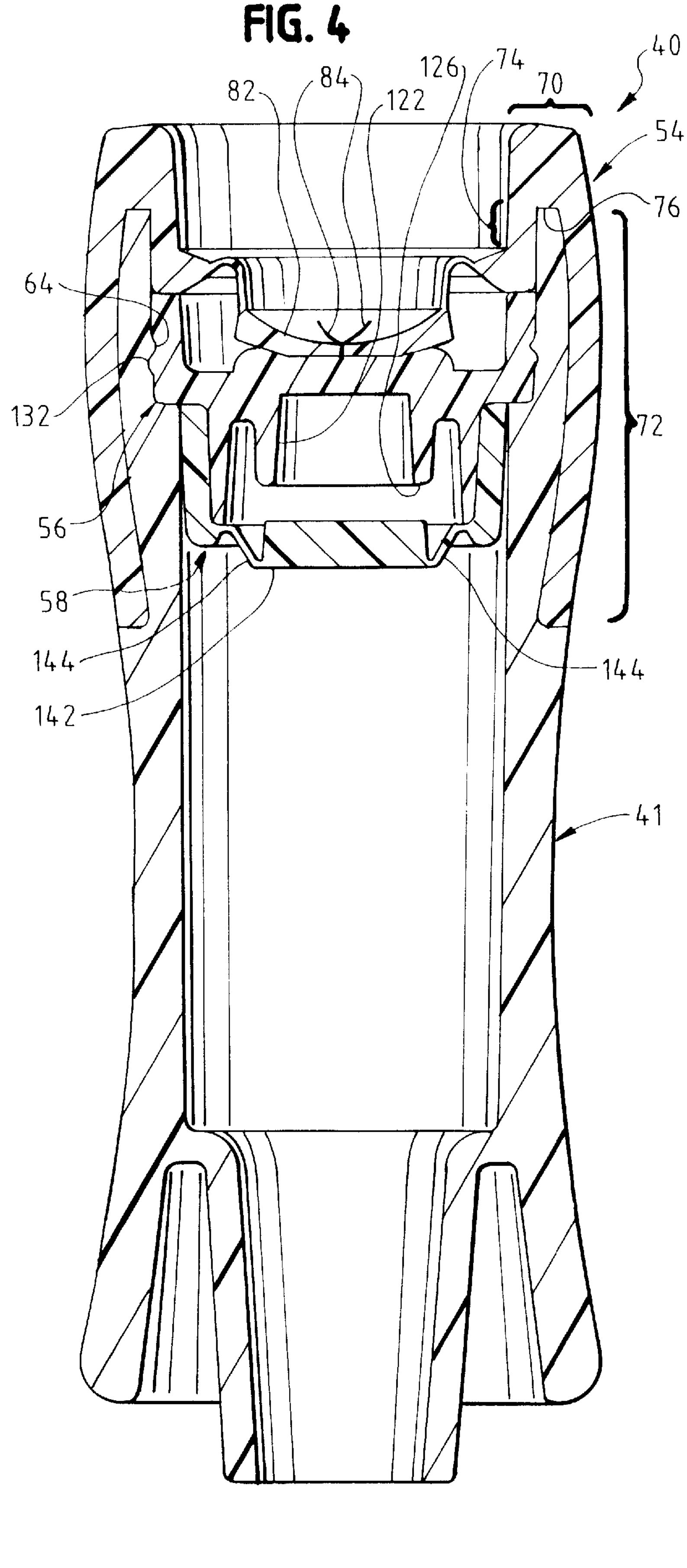
FIG. 4 is a cross-sectional view of the dispensing conduit assembly taken generally along the plane 4—4 in FIG. 1.

The preferred form of the cap valve 54 in the first embodiment illustrated in FIGS. 1–16 is molded from a thermosetting elastomeric material, such as silicone rubber, natural rubber, and the like. The valve could also be molded from a thermoplastic elastomer. Preferably, the valve cap 54 is molded from silicone rubber, such as the silicone rubber sold by Dow Chemical Company in the United States of America under the trade designation DC-595. The valve cap 54, when molded from this material, is flexible, pliable, elastic, and resilient so that the skirt 72 can be stretched around, and sealingly engaged with, the discharge conduit exterior curved surface 60 so as to tightly mount the cap valve 54 on the distal end of the discharge conduit 41 with the annular distal end of the discharge conduit 41 squeezed between the skirt 72 and the inner sleeve 74 as shown in FIGS. 3 and 4.

As shown in FIG. 9, the cap valve 54 includes a centrally disposed valve portion or valve 80. The valve 80 is a unitary molded interior portion of the cap valve 54. The valve 80, in the preferred embodiment illustrated, has the configuration and operating characteristics of a commercially available valve design substantially as disclosed in the U.S. Pat. No. 5,676,289 with reference to the valve 46 disclosed in the U.S. Pat. No. 5,676,289. The operation of such a type of valve is further described with reference to the similar valve that is designated by reference number 3d in the U.S. Pat. No. 5,409,144. The descriptions of those two patents are incorporated herein by reference to the extent pertinent and to the extent not inconsistent herewith.

As illustrated in FIGS. 2 and 9 herein, the valve 80 includes a flexible, head portion or central wall 82 which has an outwardly concave configuration and which defines at least one, and preferably two, dispensing slits 84 extending through the head portion or central wall 80. A preferred form of the valve 80 has two, mutually perpendicular, intersecting slits 84 of equal length. The intersecting slits 84 define four, generally sector-shaped, flaps or petals in the concave, central wall 82. The flaps open outwardly from the intersection point of the slits 84 in response to increasing pressure of sufficient magnitude in the well-known manner described in the above-discussed U.S. Pat. No. 5,409,144.

The valve 80 includes a skirt 86 (FIGS. 2 and 9) which extends outwardly from the valve head portion or central wall 82. At the outer (upper) end of the skirt 86 there is a thin, annular flange 88 (FIGS. 2 and 9) which extends peripherally from the skirt 86 in a downwardly angled orientation. The thin flange 88 terminates in an enlarged, much thicker, peripheral flange 100 which has a generally dovetail shaped transverse cross section.

When the cap valve 54 is properly disposed with the central valve portion or valve 80 in the closed condition on the discharge conduit 41 in FIG. 2, the valve 80 is recessed relative to the top of the end cap 70. However, when a person sucks on the end of the dispensing conduit assembly, the valve central wall 82 is forced outwardly from its recessed position, and liquid flows through the valve 80. More specifically, when the pressure below the valve 80 exceeds the external ambient pressure by a predetermined amount, the valve 80 is forced outwardly from the recessed or retracted position to an extended, open position as shown in phantom with dashed lines in FIG. 3. The valve central wall 82 (which contains the slits 84) is displaced outwardly while still maintaining its generally concave configuration. The outward displacement of the concave, central wall 82 is accommodated by the relatively, thin, flexible, skirt 86. The skirt 86 moves from a recessed, rest position to the pressurized position wherein the skirt 86 is projecting outwardly toward the open end of the dispensing conduit assembly 40.

The valve 80 does not open (i.e., the slits 84 do not open) until the valve central wall 82 has moved substantially all the way to a fully extended position. Indeed, as the valve central wall 82 moves outwardly, the valve central wall 82 is subjected to radially inwardly directed compression forces which tend to further resist opening of the slits 84. Further, the valve central wall 82 generally retains its outwardly concave configuration as it moves forward and even after it reaches the fully extended position. However, if the internal pressure is sufficiently great compared to the external pressure, then the slits 84 of the extended valve 80 begin to open to dispense product.

Figure 13:
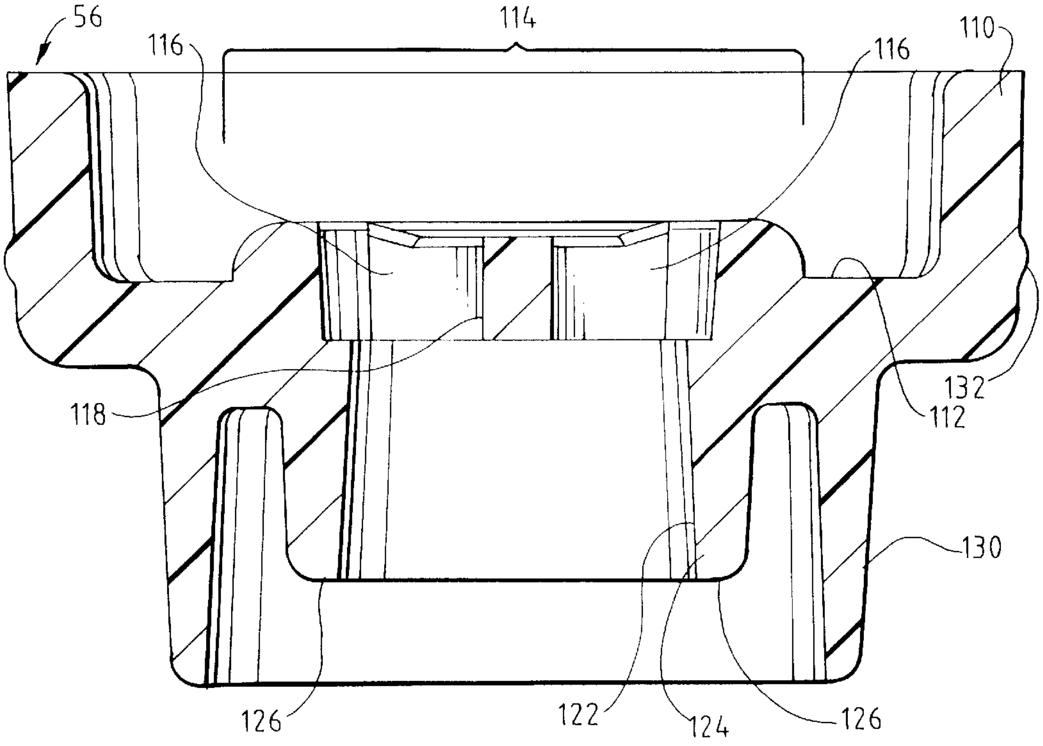
FIG. 13 is a cross-sectional view taken generally along the plane 13—13 in FIG. 11.

FIGS. 10–13 illustrate in detail the restraint structure 56 which is designed to be installed below (inwardly of) the valve 80 as shown in FIGS. 2–4. The structure 56 is preferably molded from a thermoplastic polymer such as polypropylene. As illustrated in FIG. 13, the restraint structure 56 includes an upper annular wall 110, an annular deck 112 extending radially inwardly at the bottom of the annular wall 110, and a central portion 114 radially inwardly of the annular deck 112. The central portion 114 includes four radial support arms or members 116 (FIGS. 11 and 13) which are spaced at 90 degrees and converge at a central post 118.

Figure 11:
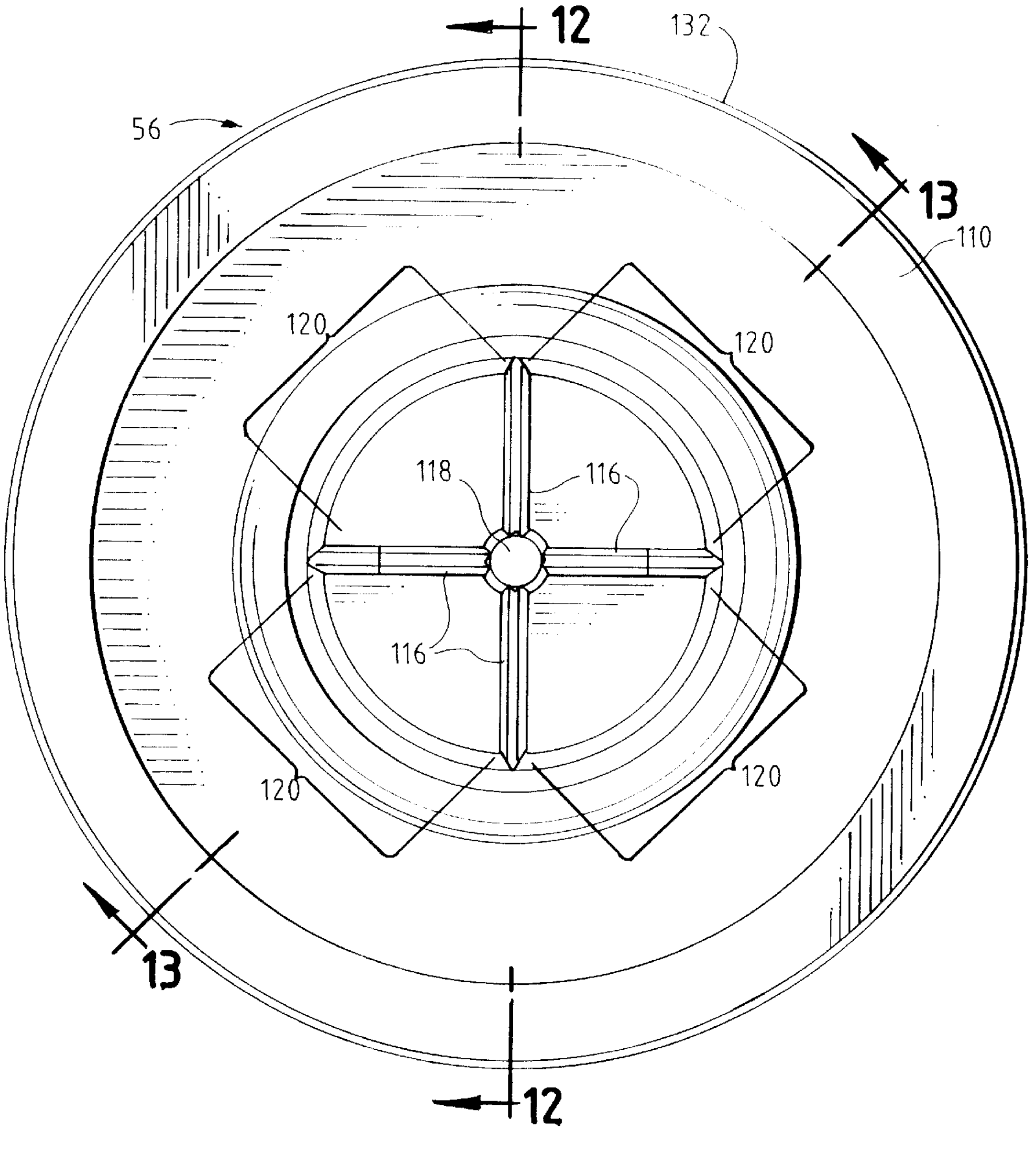
FIG. 11 is a top plan view of the restraint structure shown in FIG. 10.
Figure 12:
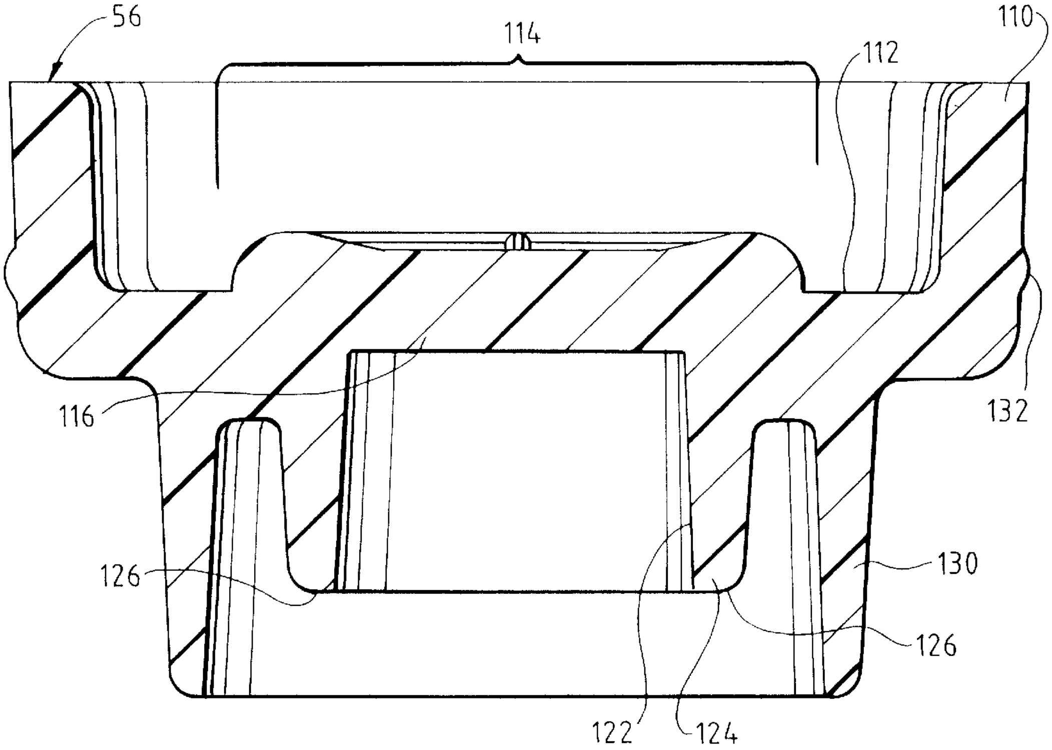
FIG. 12 is a cross-sectional view taken generally along the plane 12—12 in FIG. 11.

As can be seen in FIG. 11, four generally pie-shaped openings 120 are defined by the four support members 116. The openings 120 communicate with a central, tapered bore 122 (FIG. 13) which may be considered as part of the flow passage defined within the discharge conduit 41 when the restraint structure 56 is installed in the discharge conduit 41 as illustrated in FIG. 2. The tapered bore 122 is defined within a downwardly projecting, generally annular seat, member, or ring 124. The bottom end of the seat, member, or ring 124 defines an annular seating surface 126. The seat, member, or ring 124 is located radially inwardly of a surrounding, annular, outer wall 130 which projects downwardly from the deck 112.

Figure 10:
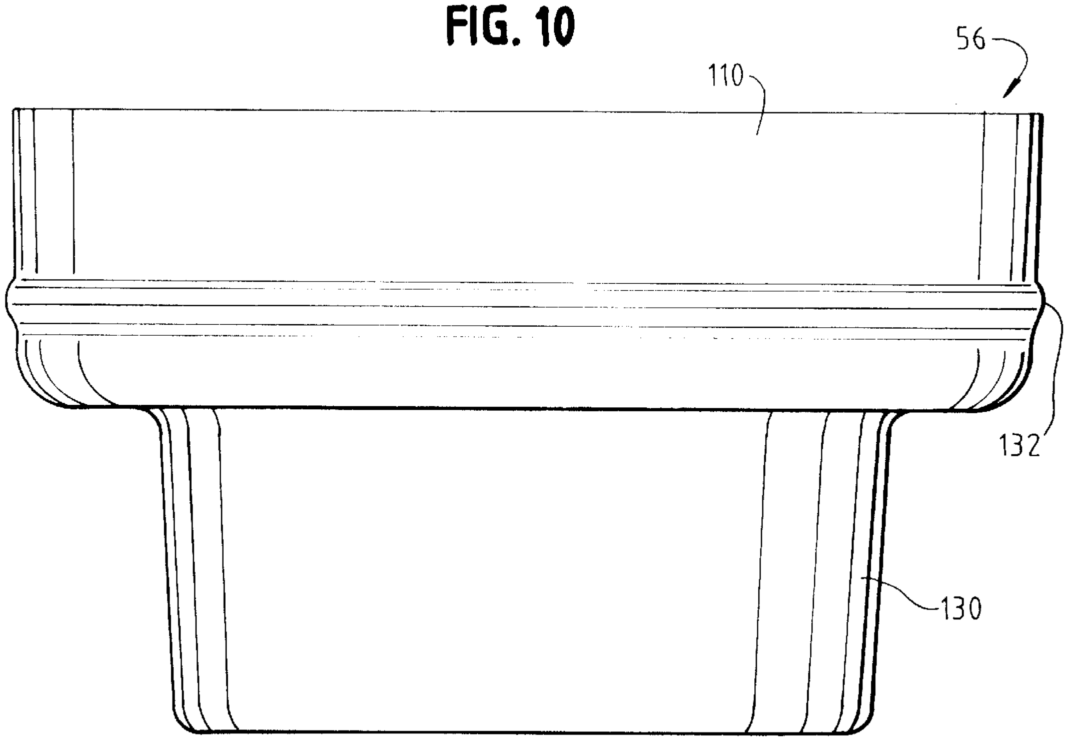
FIG. 10 is a side elevational view of the valve restraint structure shown removed from the discharge conduit.

On the exterior surface of the annular wall 110 of the restraint structure 56, there is an annular bead 132 (FIGS. 10 and 13). The bead 132 is adapted to be moved past the bead 64 (FIG. 7) in the discharge conduit 41 when the restraint structure 56 is initially installed in the open, upper, outlet end of the discharge conduit 41 as shown in FIGS. 2–4. The restraint structure bead 132 establishes a snap-fit engagement with the discharge conduit bead 64 as illustrated in FIG. 4 so as to retain the restraint structure within the discharge conduit 41. To accommodate the snap-fit engagement, the annular, outlet end of the discharge conduit 41 may be somewhat resilient and/or the restraint structure annular wall 110 may be somewhat resilient to accommodate temporary deflection of either or both walls as the bead 64 and bead 132 move past each other into the snap-fit engagement.

The central portion 114 of the restraint structure 56 is designed and positioned within the discharge conduit 41 so as to generally touch, abut, or otherwise engage the rear, downwardly facing surface (inwardly facing surface) of the central wall 82 of the valve 80 as shown in FIGS. 2–4. The valve 80 is substantially non-deformed when properly positioned at the end of the discharge conduit 41 as shown in FIGS. 2–4 with the rear surface (downwardly facing surface) engaging the top surfaces of the support members 116 of the restraint structure 56. The restraint structure 56 prevents the valve central portion 82 from deflecting downwardly (inwardly into the discharge conduit 41) to effect an inward opening of the slits 84. If the valve 80 was permitted to open inwardly, then the column of liquid within the discharge conduit 41 below the valve 80 (and within the flexible tube 34) could flow downwardly back into the backpack container owing to ambient external air passing through the inwardly open valve 80 and into the discharge conduit 41. This undesirable occurrence can be characterized as a loss of system prime which would hinder the normal, easy delivery of liquid that a person would normally expect when sucking the discharge conduit under a fully primed condition wherein liquid occupies the internal volumes of the flexible tubing 34 and discharge conduit up to the elevation of the valve 80.

Because the openings 120 are defined between the support members 116 in the restraint structure 56, liquid can flow up through the openings 120 and against the bottom, downwardly facing surface of the closed valve central portion 82. When a person sucks on the outlet end of the dispensing conduit assembly 40, the reduction in pressure on the outlet side of the valve 80 will eventually become great enough so that the differential pressure existing across the valve 80 will cause the valve 80 to open outwardly and accommodate the flow of liquid into the person's mouth. When the sucking action is terminated, the differential pressure will decrease to the point where the inherent resiliency of the valve 80 will cause it to close. However, the restraint structure 56 will prevent the valve central portion 82 from moving downwardly to an inwardly open position that could cause loss of priming liquid below the valve 80.

Figure 14:
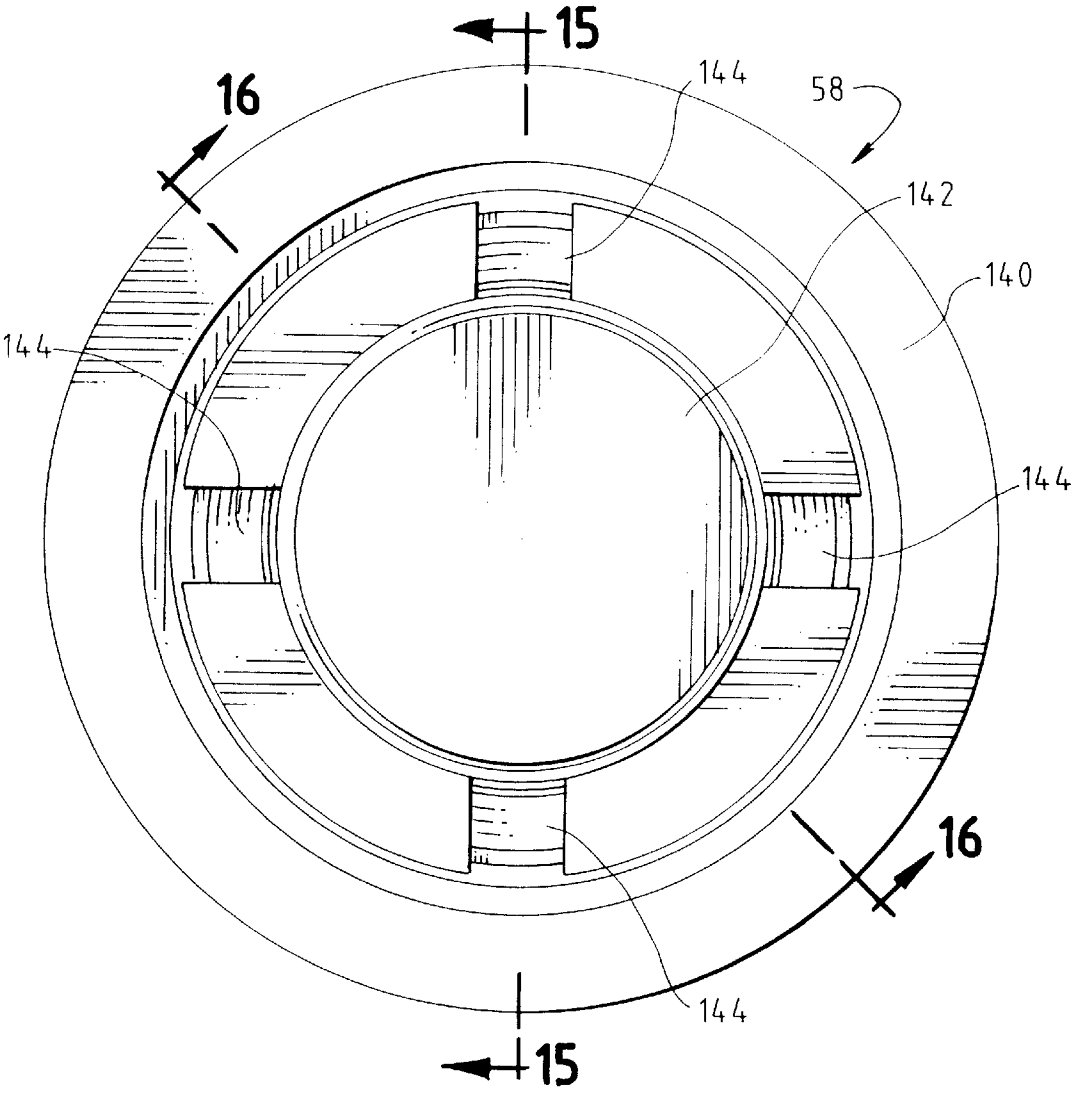
FIG. 14 is a top, plan view of the baffle shown removed from the discharge conduit.
Figure 15:
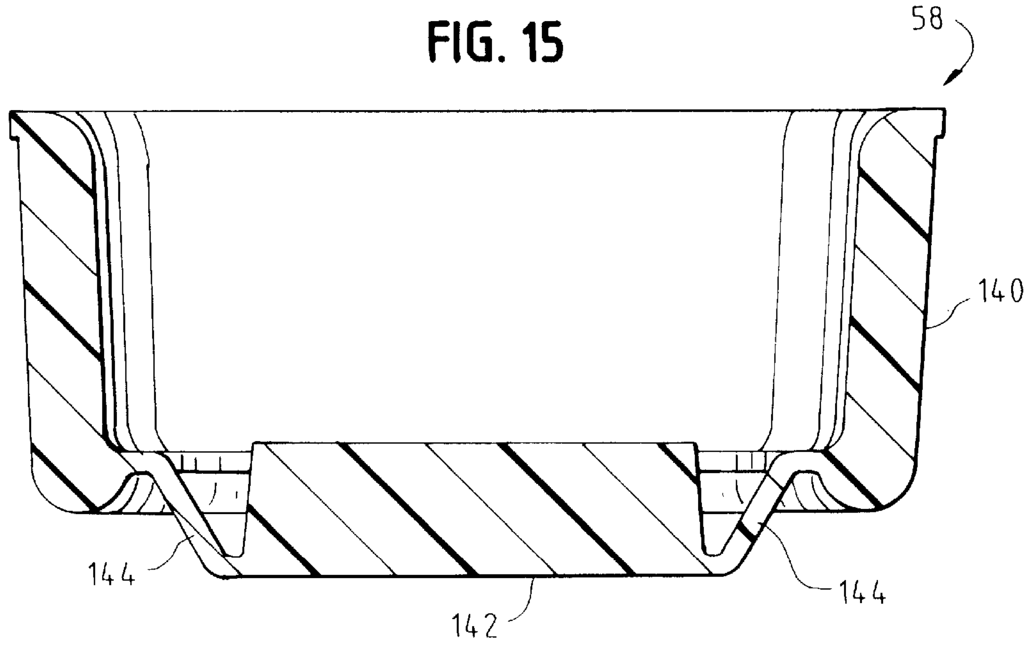
FIG. 15 is a cross-sectional view taken generally along the plane 15—15 in FIG. 14.
Figure 16:
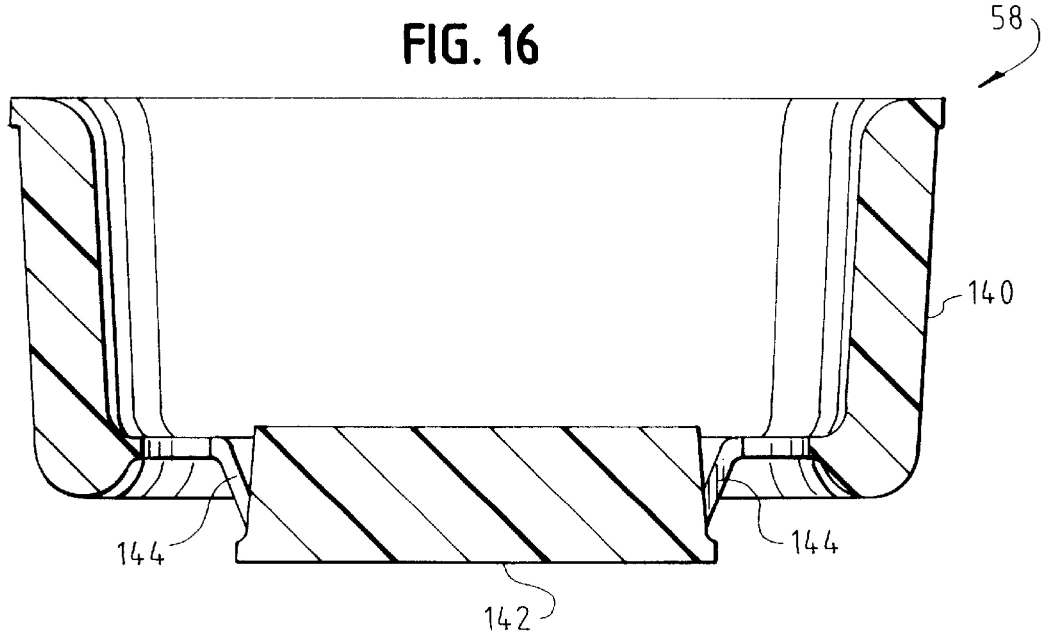
FIG. 16 is a cross-sectional view taken generally along the plane 16—16 in FIG. 14.
Figure 17:
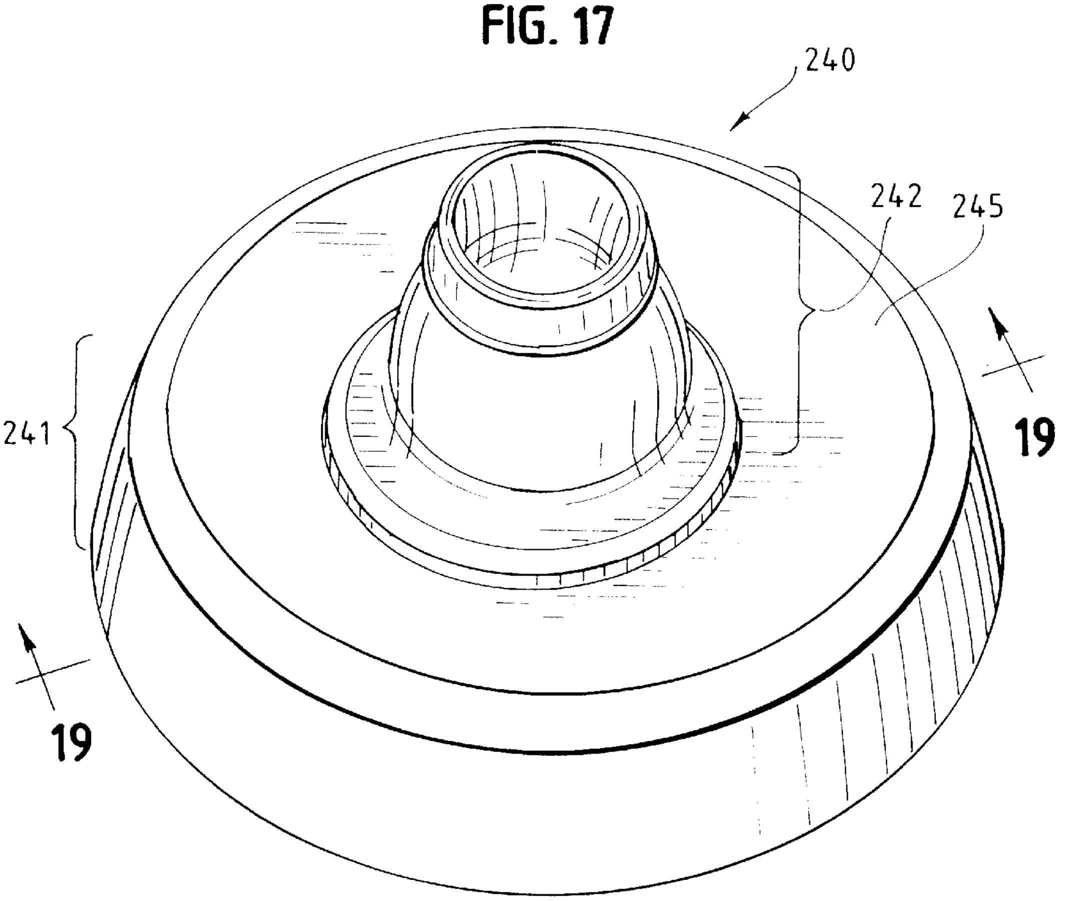
FIG. 17 is a top, perspective view of a second embodiment of the present invention in the form of a closure assembly adapted for mounting on a flexible container.
Figure 18:
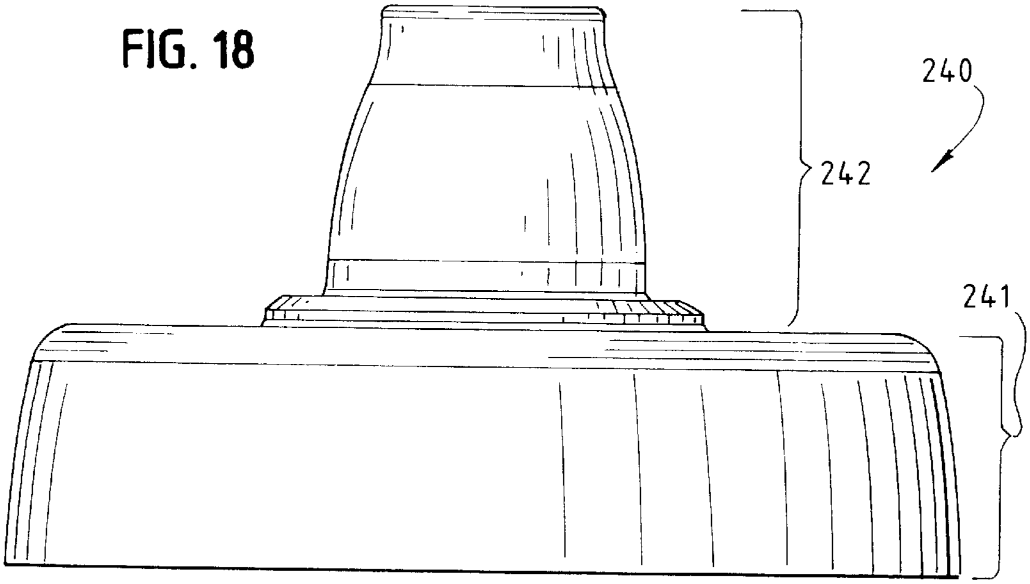
FIG. 18 is a side elevational view of the closure assembly shown in FIG. 17.

FIGS. 14–16 illustrate the baffle 58 which is mounted below the restraint structure 56 in the discharge conduit 41 as shown in FIGS. 2–4. The baffle 56 is preferably molded from the same material as the cap valve 54. In particular, the baffle 58 is preferably a flexible, resilient material molded from a thermosetting elastomeric material such as silicone, natural rubber, and the like. In a presently preferred embodiment, the baffle 58 is molded from silicone rubber sold under the trade designation DC-595 in the United States of America by Dow Chemical Company. The baffle could also be molded from a thermoplastic elastomer.

The baffle 58, in a preferred form, includes an annular wall 140, a generally circular, disk-like, central occlusion member 142, and at least one, and preferably four, resilient support members 144, which each extends from the periphery of the central occlusion member 142 to the annular wall 140. Each support member 144 biases the occlusion member 142 to an open position (illustrated in FIGS. 2–4 and 14–16) which permits flow between the support members 144 into the upper portion of the conduit flow passage adjacent the bottom surface of the valve 80.

Figure 4A:
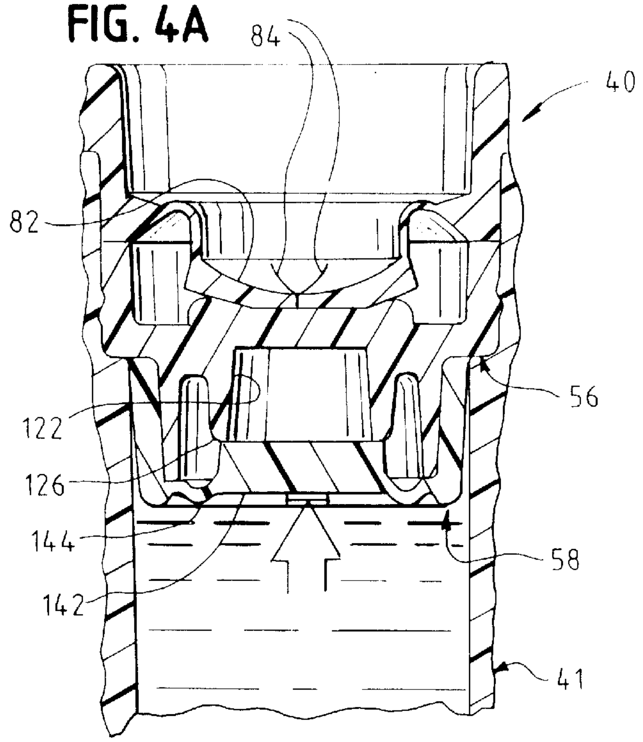
FIG. 4A is a fragmentary view similar to FIG. 4, but FIG. 4A shows the occlusion member moved, in response to an upstream hammer pressure, to a closed position for occluding flow into a portion of the conduit flow passage adjacent the valve.

The support members 144 also accommodate movement of the central occlusion member 142 between the open position illustrated in solid lines in FIGS. 2–3 and a closed position illustrated in solid lines in FIG. 4A. In the closed position illustrated in FIG. 4A, the central occlusion member 142 is seated against the seating surface 126 of the restraint structure 56. This prevents flow through the central bore 122 of the restraint member 56. The normal biasing force of the support members 144 which maintains the central occlusion member 142 in the downwardly disposed, open position (as illustrated in FIGS. 1 and 2) is overcome when a transient pressure differential of sufficient magnitude is applied to the central occlusion member 142. The baffle 58 is designed to maintain the central occlusion member 142 in the downwardly disposed, open position during normal use when liquid is being sucked through the discharge conduit assembly 40. However, if the discharge conduit assembly 40 is dropped and/or if the backpack 30 is dropped, a hydraulic hammer pressure or water hammer may be exerted on the upstream side of the central occlusion member 142 with sufficient magnitude to temporarily move the central occlusion member 142 into sealing engagement against the seating surface 126 of the restraint structure 56. When the central occlusion member 142 closes in response to such a water hammer condition, there will be no flow, or substantially no significant flow, through the valve 80. This will prevent, or at least substantially minimize, leakage through the valve 80 under such transient conditions. After the water hammer or other transient pressure increase has dissipated, the resilient support members 144 bias the central occlusion member 142 downwardly to the open position as illustrated in FIGS. 2 and 3.

Because the baffle 58 is made from a resilient material, such as silicone rubber in the preferred embodiment, the annular wall 140 can be easily stretched over, and retained on, the downwardly projecting annular wall 130 of the restraint member 56 as shown in FIG. 2. The manufacturer can initially mount the baffle 58 and restraint member 56 together as a subassembly outside of the discharge conduit 41. Then the subassembly of the two components can be inserted into the open, upper end of the discharge conduit 41 to effect a snap-fit engagement between the restraint structure annular bead 132 and the discharge conduit annular bead 64 as previously described.

Subsequently, the cap valve 54 is applied to the open, upper end of the discharge conduit 41. The cap valve 54 can also help retain the restraint member 56 within the discharge conduit 41. When properly assembled, the bottom, downwardly facing surface (inwardly facing surface) of the valve central portion 82 just contacts the upwardly facing surfaces of the arms 116 of the restraint member 56.

FIGS. 17–20 illustrate a second embodiment of the invention. The second embodiment is in the form of a dispensing closure 240 for a container (not illustrated). The dispensing closure 240 includes a body 241 and an exterior spout 242.

Figure 19:
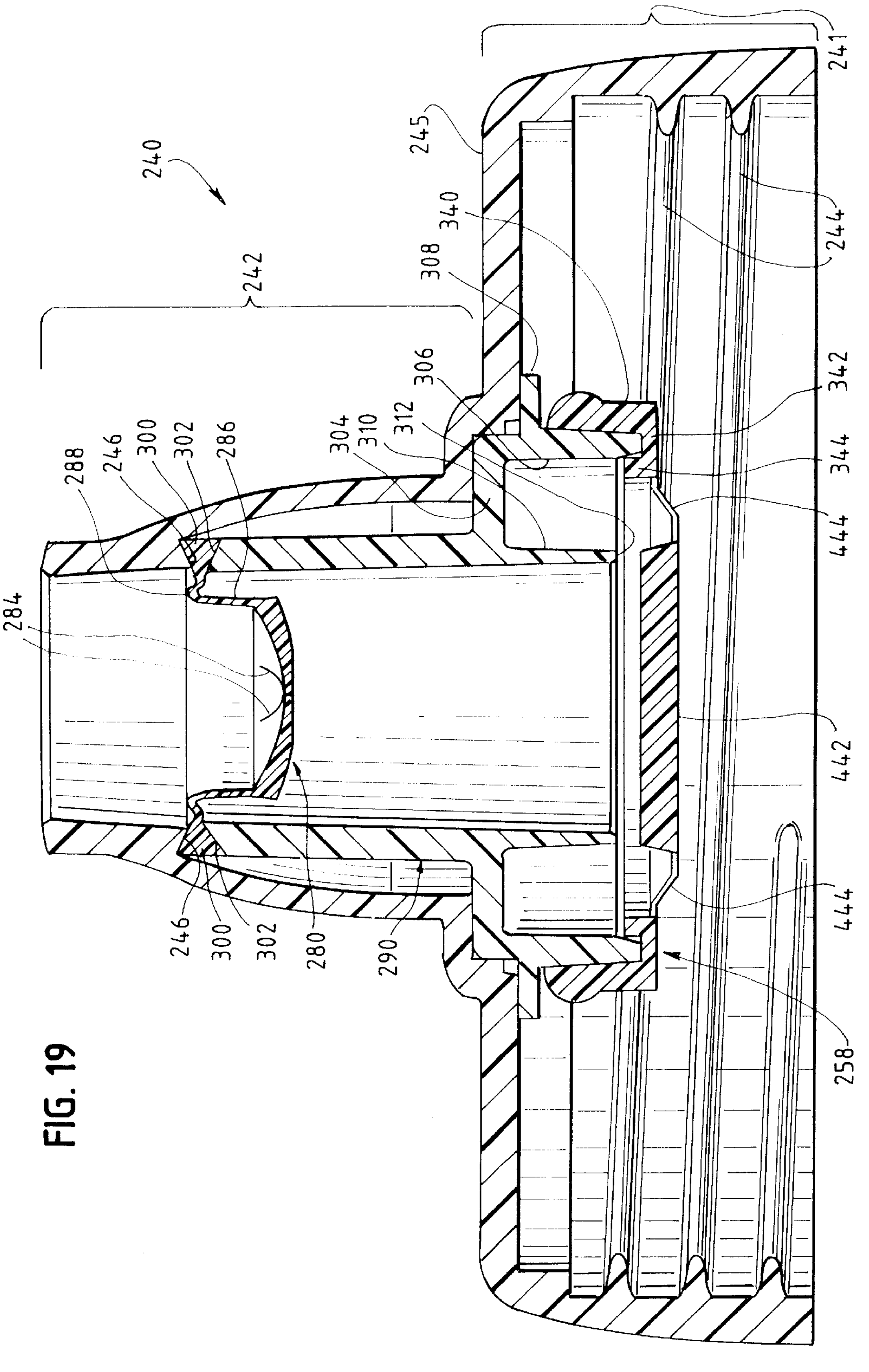
FIG. 19 is a greatly enlarged, cross-sectional view taken generally along the plane 19—19 in FIG. 17.

As shown in FIG. 19, the outer peripheral portion of the body 241 has the form of a cylindrical skirt. The interior of the body cylindrical skirt defines a thread 244. The body skirt is adapted to receive the upper end of a container mouth or neck (not illustrated). The body skirt thread 244 is adapted to matingly engage a thread on the container mouth or neck. Alternatively, the closure body skirt could be provided with some other container connecting means, such as a snap-fit bead (not illustrated) in place of the thread 244 for engaging a mating groove (not illustrated) in the container neck. The closure body 241 could also be permanently fixed to the container by means of induction melting, ultrasonic melting, gluing, or the like, depending on the materials used for the closure body 241 and the container. The closure body could also be formed as a unitary part, or extension, of the container.

The closure body 241 may have any suitable configuration. The container could have an upwardly projecting neck or other portion for being received within the particular configuration of the closure body, and the main part of the container may have a different cross-sectional shape than the container neck and closure body 241.

The closure 240 is adapted to be used with a container having a mouth or other opening to provide access to the container interior and to a product contained therein. The product may be, for example, a liquid comestible product. The product could also be any other liquid, solid, or gaseous material, including, but not limited to, a food product, a personal care product, an industrial or household cleaning product, or other chemical compositions, e.g., compositions for use in activities involving manufacturing, commercial or household maintenance, construction, agriculture, etc.

The container would typically be a squeezable container having a flexible wall or walls which can be grasped by the user and squeezed or compressed to increase the internal pressure within the container so as to force the product out of the container and through the closure 240. The container wall typically has sufficient, inherent resiliency so that when the squeezing forces are removed, the container wall returns to its normal, unstressed shape. Such a squeezable wall structure is preferred in many applications but may not be necessary or preferred in other applications.

The top of the body 241 extends radially inwardly to define an annular deck 245 which joins the base of the spout 242. The spout 242 includes an internal, frustoconical shoulder 246 which functions to retain a valve 280 within the closure 240. Mounted below the valve 280 within the spout 242 is a separate discharge element or conduit 290 to which is mounted a baffle 258.

The valve 280 is preferably identical with the valve 46 described in the U.S. Pat. No. 5,676,289 which is incorporated herein by reference thereto to the extent not inconsistent herewith. The valve 280 is also substantially identical with the valve 80 described herein above with reference to the first embodiment of the invention illustrated in FIGS. 1–16. When the pressure on the inside of the valve 280 exceeds the pressure on the outside of the valve by a predetermined amount, the valve 280 opens outwardly as described in detail in U.S. Pat. No. 5,676,289.

The valve 280 includes a central portion or central wall 282 defining two, mutually perpendicular, intersecting slits 284. The slits 284 define generally sector-shaped flaps or petals in the concave, central wall 282. The flaps open outwardly from the intersection point of the slits 284 in response to a sufficient magnitude of increasing pressure differential across the valve 280.

The valve 280 includes a skirt 286 which extends outwardly (upwardly) from the valve central wall 282. At the outer (upper) end of the skirt 286 there is a thin, annular flange 288 which extends peripherally from the skirt 286 in a downwardly angled orientation. The thin flange 288 terminates in an enlarged, much thicker, peripheral flange 300 which has a generally dove-tail shaped, transverse cross section. The bottom, frustoconical surface of the valve flange 300 is supported on an upwardly facing, mating, frustoconical surface 302 defined by the top edge of the discharge element or conduit 290.

The valve 280 is a resilient, flexible valve preferably molded from silicone rubber or other materials as described above for the valve 80 in the first embodiment of the invention illustrated in FIGS. 1–16. However, the discharge conduit 290 is a substantially rigid structure, as is the exterior spout 242, deck 245, and peripheral portion of the closure body 241. These substantially rigid structures may be molded conveniently from polypropylene.

The bottom portion of the discharge conduit 290 includes an inner, annular shoulder 304, an outer, annular skirt 306, and a peripheral flange 308 extending radially outwardly from the skirt 306. The flange 308 may be disposed against the underside of the body deck 245. The annular shoulder 304 may be engaged with the bottom portion of the spout 242. A snap-fit engagement feature may be provided between the closure spout 242 and the shoulder 304. Alternatively, or in addition, the parts may be permanently fixed together by means of adhesive, ultrasonic welding, etc. The detailed design and construction of the means for attaching the two structures form no part of the present invention.

The lower, or inner, end of the discharge conduit 290 defines an annular wall or ring 310. The bottom end of the annular wall or ring 310 defines an inwardly or downwardly facing seating surface 312 (FIGS. 19 and 20).

The baffle 258 includes a mounting structure having an outer skirt 340, a bottom wall 342, and an inner, annular wall 344. The baffle 258, including the mounting structure skirt 340, wall 342, and inner annular wall 344, are flexible and resilient. Preferably, the baffle 258 is molded from a silicone rubber, such as the silicone rubber sold under the designation DC-595 by Dow Chemical Company in the United States of America. The baffle could also be molded from a thermoplastic elastomer.

The resilient, flexible baffle 258 can be readily mounted on the bottom of the discharge conduit 290 by forcing the inner annular wall 344 and the skirt 340 apart slightly to receive the bottom of outer skirt 306 of the discharge conduit 290. The resiliency of the material from which the baffle 258 is molded establishes a tight, clamping engagement of the baffle skirt 340 and baffle inner, annular wall 344 around the discharge conduit outer skirt 306.

Figure 20:
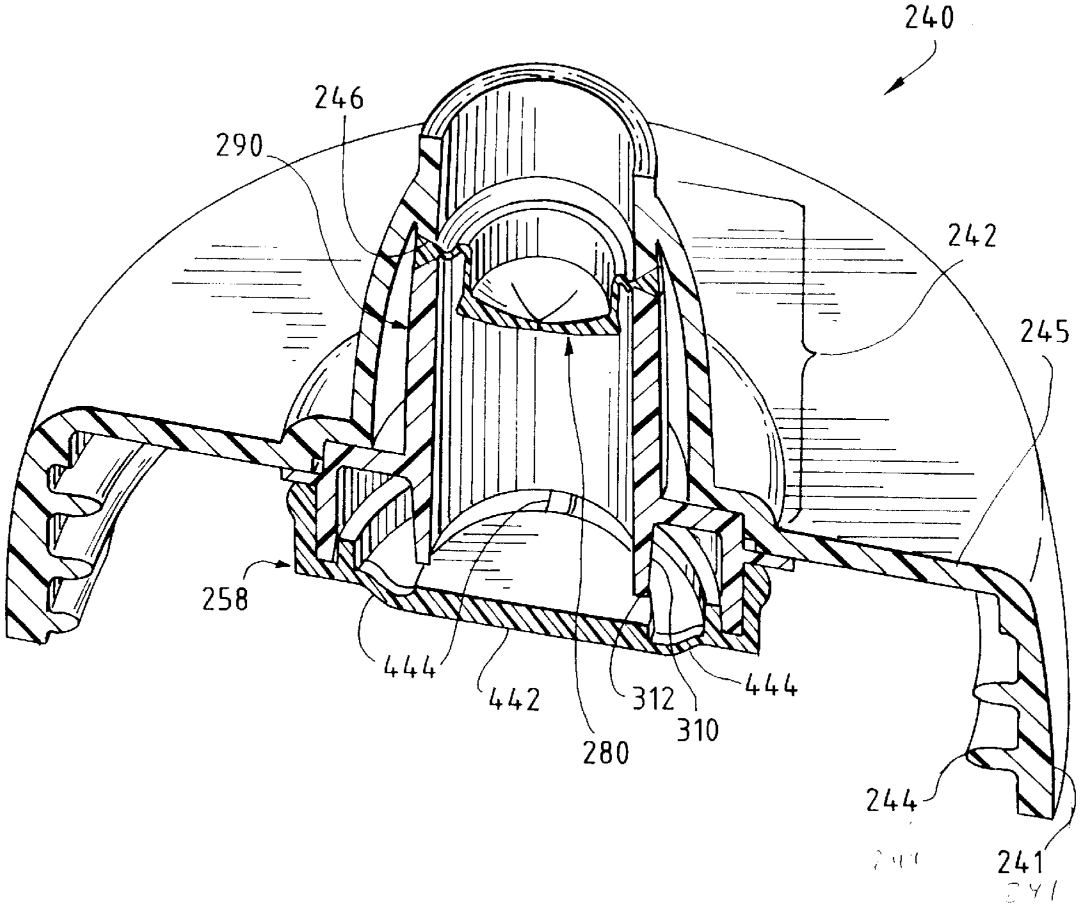
FIG. 20 is a perspective, cross-sectional view of the closure assembly shown in FIGS. 17–19.

The baffle 258 includes a central occlusion member 442 which is connected to the inner, annular wall 344 by at least one, and preferably four, resilient support members or arms 444 (two of which are visible in FIGS. 19 and 20). Preferably, each of the four support members 444 is spaced 90 degrees from the adjacent support members on either side. That is, the four support members are circumferentially spaced at 90 degree increments. A flow area or flow path is defined between each adjacent pair of support members 444.

The support members 444 normally bias, or hold, the occlusion member 442 in the open position illustrated in FIGS. 19 and 20 to permit flow into the conduit 290 up to the valve 280 (and through the valve 280 when the valve is open). The support members 444 accommodate movement of the occlusion member 442 from the open position to a closed position against the seating surface 312 on the bottom of the discharge conduit 290 when the central occlusion member 442 is subjected to an upstream, transient, hydraulic hammer pressure exceeding a predetermined amount. Such a condition could occur if the container to which the dispensing closure 240 is attached is tipped over or dropped so that the liquid in the container is moved rapidly against the occlusion member 442. The temporary closure of the occlusion member 442 will prevent, or at least significantly minimize, leakage of liquid out through the valve 280 under such conditions.

It will be noted that the second embodiment of the invention incorporated in the dispensing closure 240 illustrated in FIGS. 17–20 does not include an interior restraint structure such as the restraint structure 56 employed immediately below the valve 80 in the first embodiment described above with reference to FIGS. 1–16. Such a restraint structure (which would prevent inward opening of the valve when the exterior ambient pressure exceeds the pressure inwardly of, or below, the valve) is not needed in the second embodiment of the invention incorporated in the dispensing closure 240. This is because the dispensing closure 240 is adapted to be used on a small container which is intended to be lifted up and then tilted downwardly to the user's mouth as the walls of the container are squeezed to effect a discharge of the liquid through valve. There is no necessity for sucking liquid up from below the valve. Thus, there is no requirement for maintaining a priming quantity of liquid in the internal volume of the conduit 290 immediately below the valve 280. Hence, a slight inward opening of the valve 280 can occur to permit air to enter the container and prevent vacuum binding of the system.

Figure 21:
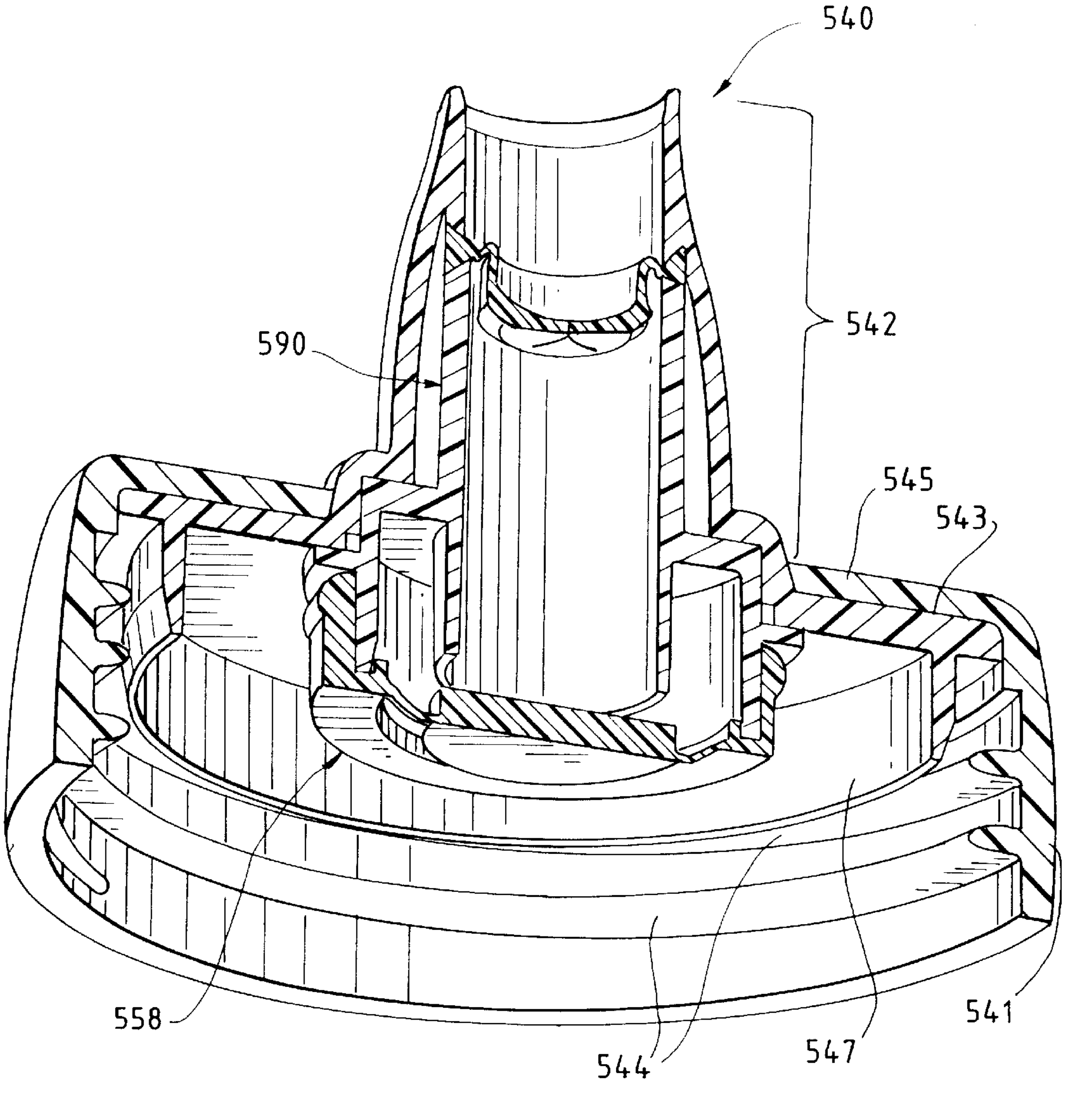
FIG. 21 is a bottom, perspective, cross-sectional view of a third embodiment of the present invention in the form of a closure assembly adapted for mounting on a flexible container.

A third embodiment of the invention is illustrated in FIG. 21 in the form of another type of dispensing closure 540. The dispensing closure 540 is similar to the dispensing closure 240 discussed above with reference to the second embodiment illustrated in FIGS. 17–20. The dispensing closure 540 differs from the closure 240 in that the closure 540 uses two separate pieces for the spout and base in place of one larger, single piece that is employed in the dispensing closure 240 to define a unitary spout and base. In particular, the dispensing closure 540 includes a separate, outer base element comprising and upper deck 545 and a depending, peripheral skirt 541. The skirt 541 is preferably provided with means for attaching the skirt 541 to the neck of a container (not illustrated), and such means may include the illustrated thread 544 or other suitable means such as those described above for the dispensing closure 240 illustrated in FIGS. 17–20.

The dispensing closure 540 includes a spout fitment with a spout portion 542 having a peripheral flange 543 which extends under the closure base deck 545. An annular sealing ring 547 depends downwardly from the flange 543 and is adapted to enter into the mouth of a container neck (not illustrated) and seal against the inside peripheral edge of the container neck.

The dispensing closure 540 also includes an internal discharge conduit 590 and a baffle 558 mounted to the bottom of the discharge conduit 590. The discharge conduit 590 and baffle 558 are identical with, and function in the same manner as, the conduit 290 and baffle 258, respectively, in the second embodiment described above with reference to FIGS. 17–20.

Figure 22:
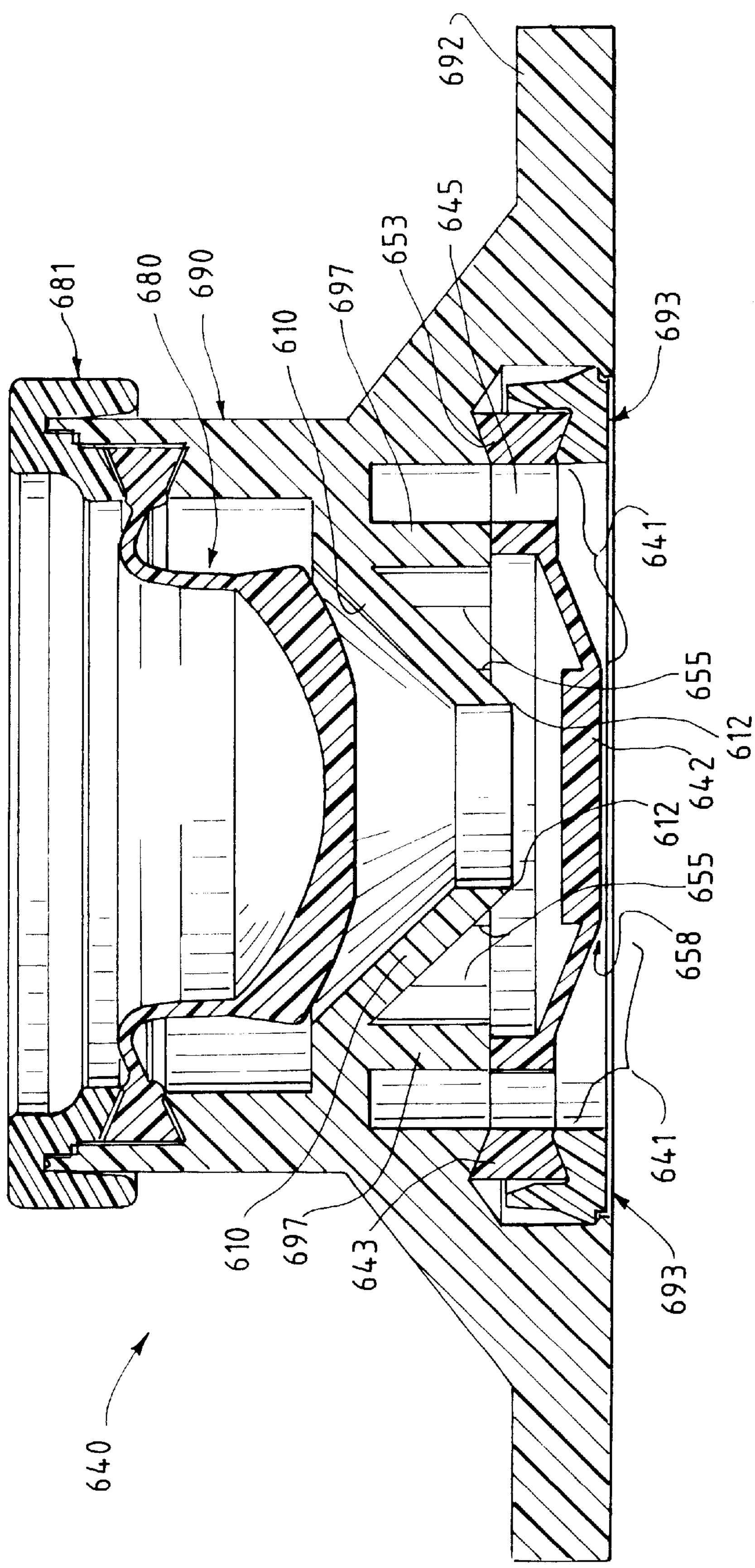
FIG. 22 is a cross-sectional view of a fourth embodiment of the present invention in the form of a closure assembly adapted for mounting on a flexible container.
Figure 23:
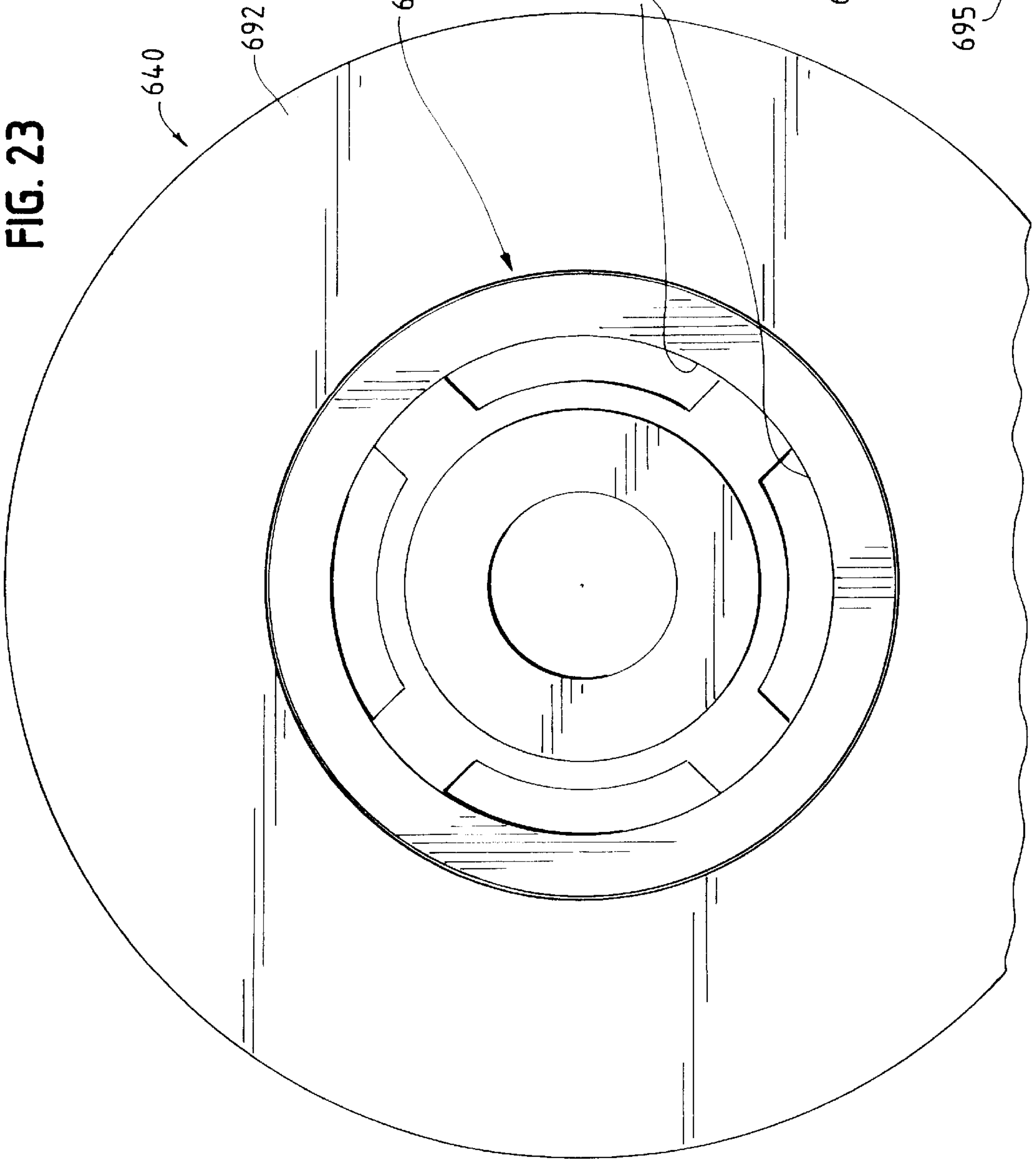
FIG. 23 is a bottom plan view taken generally along the plane 23—23 in FIG. 22.
Figure 24:
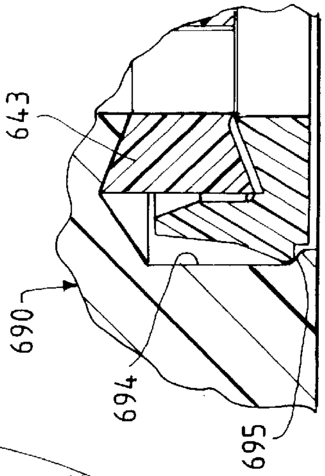
FIG. 24 is a greatly enlarged, fragmentary, cross-sectional view of a portion of the closure assembly discharge conduit, baffle flange, and snap ring retainer.

A fourth embodiment of the invention is illustrated in FIGS. 22–24 in the form of another type of dispensing closure or closure assembly 640. The dispensing closure 640 is a generally circular structure similar in a number of respects to the second embodiment of the dispensing closure 240 discussed above with reference to FIGS. 17–20.

The fourth embodiment of the dispensing closure 640 includes a discharge conduit 690 having a base flange 692 adapted to be sealingly mounted to a container (not illustrated) over the container opening. Such a container may include a conventional neck defining an opening and having threads for engaging threads on a flanged attachment ring (not illustrated). Such an attachment ring could be screwed on to the container neck to clamp the discharge conduit flange 692 to the top of the container neck. Alternatively, the discharge conduit flange 692 may be secured by other means to the container. For example, the discharge conduit flange 692 could be permanently fixed to the container by means of induction melting, ultrasonic melting, gluing, or the like. The discharge conduit 690 could also be formed as a unitary part, or extension of, the container.

The container (not illustrated) would typically be a squeezable container such as the container described above with reference to the first, second, and third embodiments. Such a container would typically hold a liquid product, such as the liquid products described above with reference to the first, second, and third embodiments.

Mounted within the discharge conduit 690 is a valve 680. The valve 680 is identical with the valve 280 described above with reference to the second embodiment illustrated in FIGS. 17–20. The valve 680 is held in place at one end of the discharge conduit 690 by an outer retainer or outer retaining member or ring 681 which is preferably fixed to the end of the discharge conduit 690 by means of ultrasonic welding. Other attachment means could be employed, such as a snap-fit engagement.

The discharge conduit 690 includes a unitary, molded, frustoconical wall 610 defining a peripheral edge or seating surface 612. A baffle 658 is mounted adjacent the wall 610 at the bottom end of the discharge conduit 690 and is retained therein by an inner retainer or inner retaining member or ring 693. Preferably, the retaining ring 693 is mounted to the discharge conduit 690 in a snap-fit engagement. To this end, the discharge conduit 690 defines an undercut annular region 694 (FIG. 24) for receiving a shoulder 695 on the periphery of the ring 693.

The baffle 658 is resilient and flexible. Preferably, the baffle 658 is molded from a silicone rubber, such as the silicone rubber sold under the designation DC-595 by Dow Chemical Company in the United States of America. The baffle includes a central occlusion member 642, a peripheral membrane section 641, and an annular flange 653 which has a dovetail cross section. Circumferentially spaced-apart apertures 645 are defined in the baffle membrane 641 adjacent the flange 643 to define flow passages. Adjacent the upper ends of the apertures 645, the discharge conduit 690 includes an interior annular wall 697 which has circumferentially spaced-apart notches 655 for accommodating flow from the apertures 645 toward the frustoconical wall 610.

The normal, substantially unstressed configuration of the baffle 658 is such that the membrane 641 biases the occlusion member 642 to the open position as illustrated in FIG. 22 wherein the occlusion member 642 is spaced away from the seating surface 612. Thus, liquid can flow up through the peripheral apertures 645, through the circumferential notches 655 in the annular wall 697, and past the seating surface 612 into the region below the valve 680.

The baffle membrane 641 accommodates movement of the occlusion member 642 from the open position (FIG. 22) to a closed position (not illustrated) against the seating surface 612 when the central occlusion member 658 is subjected to an upstream, transient, hydraulic hammer pressure exceeding a predetermined amount. Such a condition could occur if a container to which the container closure 640 is attached is tipped over or dropped so that the liquid in the container is moved rapidly against the occlusion member 642. The temporary closure of the occlusion member 642 will prevent, or at least significantly minimize, leakage of liquid out of the valve 680 under such conditions.

Figure 25:
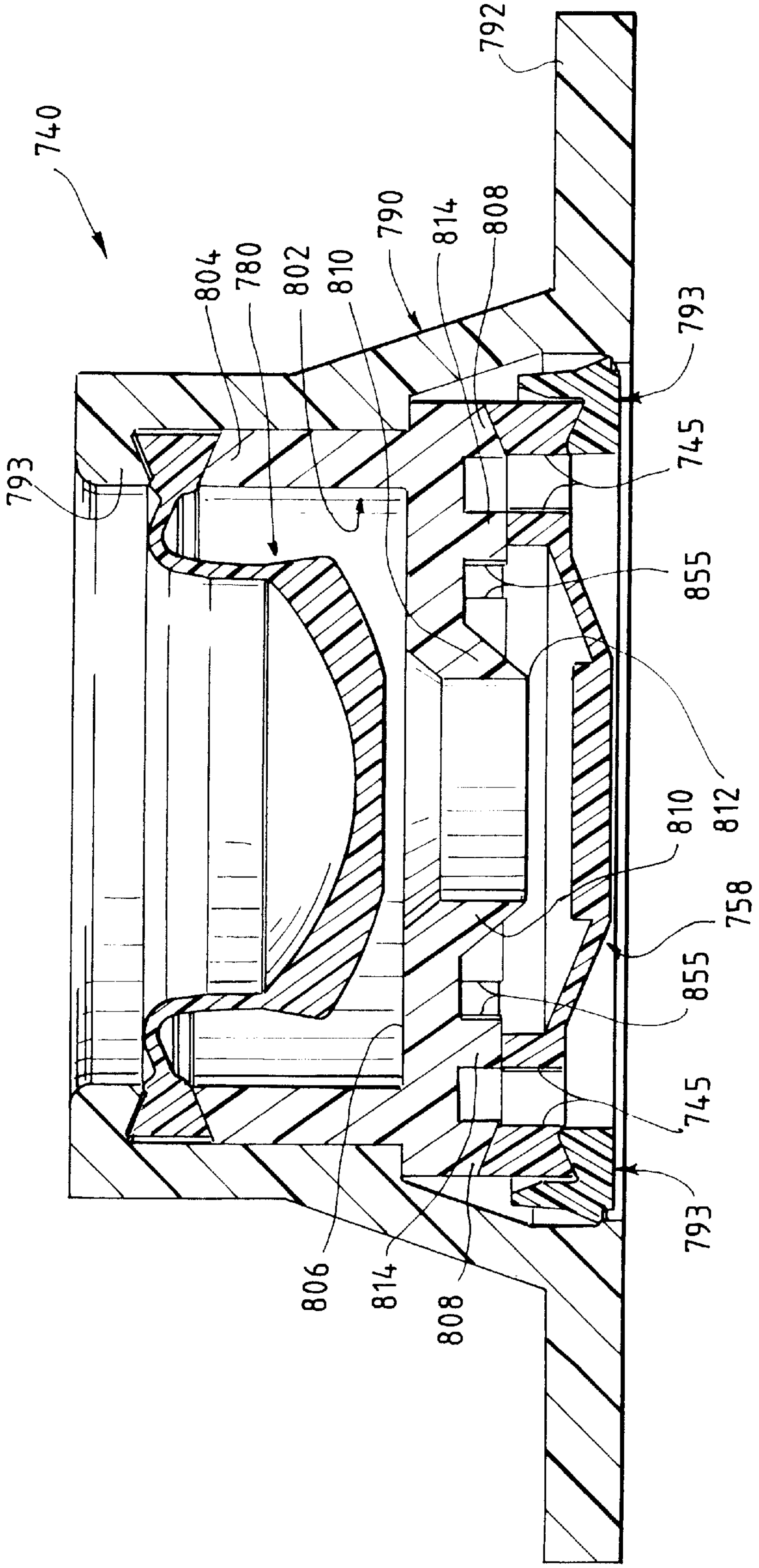
FIG. 25 is a cross-sectional view of a fifth embodiment of the present invention in the form of a closure assembly adapted for mounting on a flexible container.

FIG. 25 illustrates a fifth embodiment of the invention in the form of a dispensing closure or closure assembly 740. The dispensing closure 740 is similar to the dispensing closure 640 discussed above with reference to the fourth embodiment illustrated in FIGS. 22–24. The sixth embodiment includes a valve 780, a baffle 758, and an inner retainer 793 which are identical with the valve 680, baffle 658, and retainer 693, respectively, described above with reference to the fourth embodiment illustrated in FIGS. 22–24.

The fifth embodiment of the closure assembly 740 includes a discharge conduit 790 having a mounting flange 792 for mounting the conduit to a container (not illustrated) in any of the same ways that the discharge conduit 690 can be mounted to a container as discussed above with respect to the fourth embodiment illustrated in FIGS. 22–24. The upper end of the discharge conduit 792 includes an annular lip, flange, or shoulder 793 for retaining an upper peripheral portion of the valve 780.

The fifth embodiment of the dispensing system or closure 740 includes a separate, combination internal valve retainer and baffle seat member 802. The member 802 includes an outer annular wall 804 for engaging the underside of the peripheral portion of valve 780.

The member 802 also includes a lower deck 806 from which projects an outer, annular, clamping wall 808 for clamping a peripheral portion of the baffle 758. The deck 806 also includes a downwardly projecting, frustoconical, inner, annular wall 810 defining a edge or seating surface 812. The seating surface 812 is adapted to be engaged by the baffle 758 when the baffle 658 is subjected to a transient, hydraulic pressure which would force the baffle 758 against the seating surface 812.

The deck 806 also includes an intermediate annular wall 814 having a plurality of circumferentially spaced-apart notches 855 which communicate with apertures 745 in the baffle 758 to accommodate a flow from the container past the open baffle and seating surface 812, and then into the space adjacent the valve 780 when the baffle is in the normal, open configuration as illustrated in FIG. 25.

The member 802 is secured to the inside of the discharge conduit 790 by suitable means, such as a snap-fit engagement. Alternatively, the member 802 could be permanently secured by means of ultrasonic welding, adhesive, or the like. Other forms of releasable attachment structures could be employed, such as threads.

It will be readily apparent from the foregoing detailed description of the invention and from the illustrations thereof that numerous variations and modifications may be effected without departing from the true spirit and scope of the novel concepts or principles of this invention.

What is claimed is:

1. A dispensing system for dispensing liquid from a container, said system comprising:

a discharge conduit defining a flow passage for establishing fluid communication with said liquid from said container;

a resilient valve that extends across said discharge conduit flow passage, has an interior side for being contacted by said liquid and an exterior side exposed to the ambient external atmosphere, and defines a dispensing orifice that opens when the pressure on said valve interior side exceeds the pressure on said valve exterior side by a predetermined amount; and a resilient baffle located upstream of said valve, said baffle including an occlusion member supported by at least one resilient support member which accommodates movement of said occlusion member between a closed position occluding flow into at least a portion of said conduit flow passage when said baffle is subjected to an upstream hydraulic hammer pressure, and biases said occlusion member to an open position permitting flow into said conduit flow passage adjacent said valve when said baffle is not subjected to said hydraulic hammer pressure.

2. The dispensing system in accordance with claim 1 in which said discharge conduit has an outlet end defined by an annular end wall; and said valve is part of a larger cap valve structure which includes an elastic outer skirt and an elastic inner sleeve spaced radially inwardly of said outer skirt to define a channel receiving said discharge conduit annular end wall.

3. The dispensing system in accordance with claim 1 in which said valve includes a central wall having two intersecting slits defining said orifice which is closed until the pressure on said valve interior side exceeds the pressure on said valve exterior side by a predetermined amount.

4. The dispensing system in accordance with claim 1 in which an annular seat is located in said discharge conduit inwardly of said valve and defines an inwardly facing, annular seating surface;

said baffle includes an outer, annular wall;

said baffle occlusion member is a disk that is centrally disposed relative to said baffle annular wall and that is adapted to seal against said annular seating surface; and said baffle includes a plurality of said support members each extending radially from said disk to said baffle annular wall, said baffle support members being circumferentially spaced around said disk to define flow passages between them.

5. The dispensing system in accordance with claim 1 in which a seat structure is disposed in said discharge conduit between said baffle and said valve, said seat structure including an inner annular wall having a first end defining an annular seating surface for being engaged by said baffle and having a second end with a plurality of rigid members radiating from a central post to define generally sector-shaped flow passages accommodating flow from said first end through said second end against said valve.

6. The dispensing system in accordance with claim 1 in which said discharge conduit includes a tapered exterior portion; and said valve is part of a larger cap valve structure which includes a resilient, outer skirt having a tapered interior wall for engaging said conduit tapered exterior portion.

7. The dispensing system in accordance with claim 1 in which said valve is part of a larger cap valve structure having an annular end cap portion, and said valve is recessed below said annular end cap portion when said valve is closed.

8. The dispensing system in accordance with claim 1 in which said discharge conduit has an inlet end adapted for connecting to a flexible tube.

9. The dispensing system in accordance with claim 1 in which said system further includes an inner retaining member secured to said discharge conduit upstream of and against, a peripheral portion of said baffle to hold said baffle in said discharge conduit.

10. The dispensing system in accordance with claim 9 in which said inner retaining member is in snap-fit engagement with said discharge conduit.

11. The dispensing system in accordance with claim 1 in which said system includes an outer retaining member secured to said discharge conduit upstream of, and against, a peripheral portion of said valve to hold said valve in said discharge conduit.

12. The dispensing system in accordance with claim 11 in which said outer retaining member is ultrasonically welded to said discharge conduit.

13. A dispensing system for dispensing liquid from a container, said system comprising:

a discharge conduit defining a flow passage for establishing fluid communication with said liquid from said container, said discharge conduit having an upstream inlet end and having a downstream outlet end defined by a generally annular outlet end wall;

a cap valve structure which includes an annular end cap portion having an elastic outer skirt and an elastic inner sleeve spaced radially inwardly of said outer skirt to define a channel receiving said discharge conduit annular outlet end wall which is snugly clamped between said inner sleeve and said outer skirt, and a resilient valve that extends from said inner sleeve across said discharge conduit flow passage, has an interior side for being contacted by said liquid and an exterior side exposed to the ambient external atmosphere, and has a central wall having two intersecting slits which define a normally closed dispensing orifice that opens when the pressure on said valve interior side exceeds the pressure on said valve exterior side by a predetermined amount;

a seat structure disposed in said discharge conduit upstream of said cap valve, said seat structure including an inner annular wall having a first end defining an annular seating surface and having a second end with a plurality of rigid members radiating from a central post to define generally sector-shaped flow passages accommodating flow through said seat structure from said first end through said second end against said valve central wall;

a resilient baffle located in said discharge conduit upstream of said seat structure, said baffle including an outer, annular wall, said baffle having an occlusion member in the form of a disk that is centrally disposed relative to said baffle annular wall and that is adapted to seal against said annular seating surface, said baffle including a plurality of support members each extending radially from said disk to said baffle annular wall, said baffle support members being circumferentially spaced around said disk to define flow passages between them and to accommodate movement of said disk between a closed position occluding flow into at least a portion of said conduit flow passage when said baffle is subjected to an upstream hydraulic hammer pressure, and bias said disk to an open position permitting flow into said conduit flow passage adjacent said valve when said baffle is not subjected to said hydraulic hammer pressure.

14. The dispensing system in accordance with claim 13 in which said discharge conduit includes a tapered exterior portion; and said cap valve structure outer skirt has a tapered interior wall for engaging said conduit tapered exterior portion.

15. The dispensing system in accordance with claim 13 in which said valve is recessed below said annular end cap portion when said valve is closed.

16. The dispensing system in accordance with claim 13 in which said discharge conduit inlet end is adapted for connecting to a flexible tube.

17. A dispensing system for dispensing liquid from a container, said system comprising:

a discharge conduit that has an upstream inlet end and a downstream outlet end between which is defined a flow passage for establishing fluid communication with said liquid from said container;

a resilient valve that extends across said discharge conduit flow passage, has an interior side for being contacted by said liquid and an exterior side exposed to the ambient external atmosphere, and has a central wall defining a dispensing orifice that opens when the pressure on said valve interior side exceeds the pressure on said valve exterior side by a predetermined amount;

a seat structure disposed in said discharge conduit upstream of said cap valve, said seat structure including an inner annular wall defining an annular seating surface past which liquid can flow through said seat structure against said valve central wall; and a resilient baffle located in said discharge conduit upstream of said seat structure, said baffle including an occlusion member supported by at least one resilient support member which accommodates movement of said occlusion member between a closed position against said seating surface to occlude flow into at least a portion of said conduit flow passage when said baffle is subjected to an upstream hydraulic hammer pressure, and biases said occlusion member to an open position permitting flow into said conduit flow passage adjacent said valve central wall when said baffle is not subjected to said hydraulic hammer pressure.

18. The dispensing system in accordance with claim 17 in which said discharge conduit includes a tapered exterior portion; and said valve is part of a larger cap valve structure which includes a resilient, elastic, outer skirt having a tapered interior wall for engaging said conduit tapered exterior portion, said outer skirt having a tapered interior wall for engaging said conduit tapered exterior portion.

19. The dispensing system in accordance with claim 17 in which said valve is part of a larger cap valve structure having an annular end cap portion; and said valve is recessed below said annular end cap portion when said valve is closed.

20. The dispensing system in accordance with claim 17 in which said discharge conduit has an inlet end which is adapted for connecting to a flexible tube.

* * * * *

UNITED STATES PATENT AND TRADEMARK OFFICE
CERTIFICATE OF CORRECTION

PATENT NO. : 6,112,952
DATED : September 5, 2000
INVENTOR(S) : John M. Hess, III, Timothy R. Socier, Steven R. Tuckey It is certified that error appears in the above-identified patent and that said Letters Patent is hereby corrected as shown below:

Title Page,
Left-hand column, at the end of the column, the following documents should be listed:

| | | |
|---|---|---|
| 4,061,254 | 12/77 | Nilson |
| 4,226,342 | 10/80 | Laauwe |
| 4,230,240 | 10/80 | Laauwe |
| 4,747,518 | 05/18 | Laauwe |
| 4,991,745 | 02/91 | Brown |
| 5,012,956 | 05/91 | Stoody |
| 5,115,950 | 05/92 | Rohr |
| 5,226,568 | 07/93 | Newton et al. |
| 5,271,531 | 12/93 | Rohr et al. |
| 5,472,122 | 12/95 | Appleby |
| 5,603,436 | 02/97 | Leoncavallo et al. |
| 5,676,289 | 10/97 | Gross et al. |
| 5,680,969 | 10/97 | Gross |
| 5,692,651 | 12/97 | Fuchs |
| 5,704,522 | 01/98 | Orgeolet et al. |
| 5,839,626 | 11/98 | Gross et al. |
| 5,842,618 | 12/98 | Julemont et al. |
| 5,850,908 | 12/98 | Jasek |
| 5,857,595 | 01/99 | Nilson |

Column 13,
Line 66, "that extends" should be -- that (1) extends --;
Line 67, "passage, has" should be -- passage, (2) has --;

Column 14,
Line 2, "and defines" should be -- and (3) defines --;
Line 8, "which accommodates" should be -- which (1) accommodates --;
Line 12, "and biases" should be -- and (2) biases;

UNITED STATES PATENT AND TRADEMARK OFFICE

CERTIFICATE OF CORRECTION

PATENT NO. : 6,112,952
DATED : September 5, 2000
INVENTOR(S) : John M. Hess, III, Timothy R. Socier, Steven R. Tuckey It is certified that error appears in the above-identified patent and that said Letters Patent is hereby corrected as shown below:

Column 15,
Line 24, "includes an" should be -- includes (1) an --;
Line 29, "and a" should be -- and (2) a --;
Line 30, "that extends" should be -- that (a) extends --;
Line 31, "passage, has" should be -- passage, (b) has --;
Line 32, "and an" should be -- and (c) has an --;
Line 59, "to accommodate" should be -- to (1) accommodate --;
Line 63, "and bias" should be -- and (2) bias --;

Column 16,
Line 21, "that extends" should be -- that (1) extends --;
Line 22, "passage, has" should be -- passage, (2) has --;
Line 24, "and has" should be -- and (3) has --;
Line 36, "which accommodates" should be -- which (1) accommodates --;
Line 42, "and biases" should be -- and (2) biases --.

Signed and Sealed this

Seventh Day of August, 2001

Nicholas P. Godici

*Attest:*

NICHOLAS P. GODICI

*Attesting Officer* *Acting Director of the United States Patent and Trademark Office*